(12) United States Patent
Isobe et al.

(10) Patent No.: US 7,990,088 B2
(45) Date of Patent: Aug. 2, 2011

(54) MOTOR CONTROL APPARATUS

(75) Inventors: Eiji Isobe, Kariya (JP); Shigeru Yoshiyama, Kariya (JP)

(73) Assignee: Denso Corporation, Kariya (JP)

( * ) Notice: Subject to any disclaimer, the term of this patent is extended or adjusted under 35 U.S.C. 154(b) by 505 days.

(21) Appl. No.: 12/257,413

(22) Filed: Oct. 24, 2008

(65) Prior Publication Data

US 2009/0108791 A1 Apr. 30, 2009

(30) Foreign Application Priority Data

Oct. 31, 2007 (JP) ................................. 2007-283601

(51) Int. Cl.
*H02P 6/04* (2006.01)
(52) U.S. Cl. ..................... 318/400.11; 318/561; 318/701
(58) Field of Classification Search ............. 318/400.11, 318/561, 701, 568.24, 703, 721, 724, 266, 318/400.14, 400.21, 400.4, 466
See application file for complete search history.

(56) References Cited

U.S. PATENT DOCUMENTS

| | | | |
|---|---|---|---|
| 7,084,597 B2 | 8/2006 | Nakai et al. | |
| 7,221,116 B2 | 5/2007 | Nakai et al. | |
| 2006/0197489 A1* | 9/2006 | Nakai et al. | ................... 318/701 |
| 2007/0182353 A1 | 8/2007 | Kamio et al. | |

* cited by examiner

*Primary Examiner* — Karen Masih
(74) *Attorney, Agent, or Firm* — Nixon & Vanderhye PC

(57) ABSTRACT

At an initial drive operation after turning on of an electric power source, an ECU sequentially changes each current exciting phase among multiple phases through one complete cycle at a predetermined time schedule, so that a rotational position of a rotor and the corresponding exciting phase coincide with each other at some timing during the initial drive operation, and thereby the rotor is rotated. The ECU counts the A-phase signal and the B-phase signal during the rotation of the rotor in the initial drive operation and learns a relationship among a count value of the A-phase signal and the B-phase signal, a rotational position of the rotor and each exciting one of the plurality of phases at an end of the initial drive operation. When the ECU determines that a result of the learning is erroneous, the ECU re-executes the learning by re-executing the initial drive operation.

4 Claims, 17 Drawing Sheets

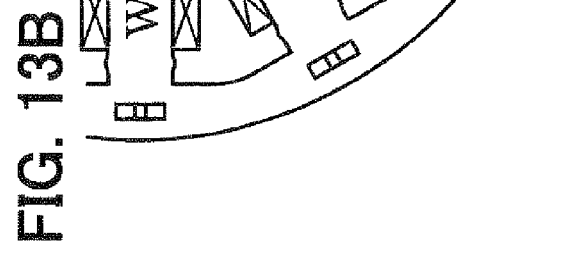
FIG. 13A
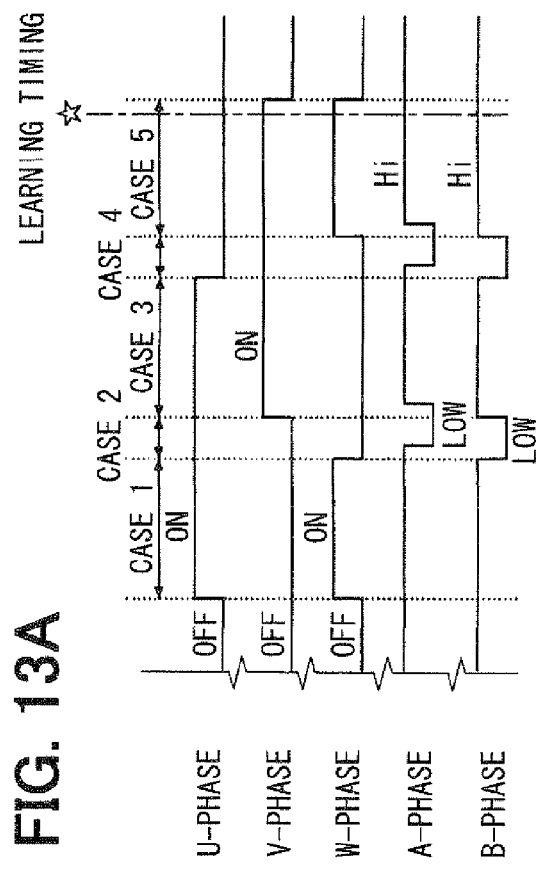
FIG. 13B
FIG. 13C
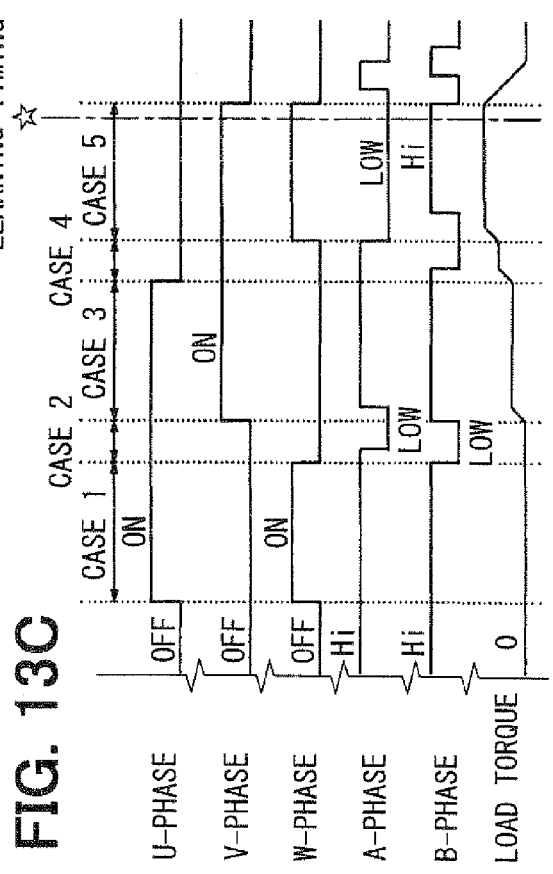
FIG. 13D

MOTOR CONTROL APPARATUS

CROSS REFERENCE TO RELATED APPLICATION

This application is based on and incorporates herein by reference Japanese Patent Application No. 2007-283601 filed on Oct. 31, 2007.

BACKGROUND OF THE INVENTION

1. Field of the Invention

The present invention relates to a motor control apparatus that controls rotation of a rotor of an electric motor.

2. Description of Related Art

Lately, even in the automobile industry, many mechanical drive systems have been replaced with electrical drive systems, each of which uses an electric motor as a drive source thereof, to satisfy a demand for improving installation space saving of the system, a demand for improving an easiness of assembling of the system, a demand for improving a controllability of the system and/or the like. For example, a range change mechanism of an automatic transmission of a vehicle has been changed to use an electric motor as a drive source thereof (see, for example, Japanese Patent No. 3800529 corresponding to US 2007/0182353A1). In this system, an encoder, which senses a rotational position of the rotor, is provided to the motor. At the time of changing the range of the automatic transmission, the motor is rotated to a target rotational position (a target count value), which corresponds to a target range of the automatic transmission, based on a count value of output pulses of the encoder.

In this type of the motor having the encoder, only the rotational amount (the rotational angle) of the rotor from a start position of the rotor can be sensed based on the count value of the output pulses of the encoder upon the starting. Therefore, the motor cannot be normally driven unless an appropriate measure is taken to obtain a relationship between the encoder count value and the rotational position of the rotor (the energization phase) by sensing an absolute rotational position of the rotor.

In view of the above point, according to Japanese Patent No. 3800529 corresponding to US 2007/0182353A1), an initial position learning process is executed in an initial drive operation right after turning on of an electric power source. In this learning process, the exciting phase(s) of the motor is sequentially changed at a predetermined time schedule through one complete cycle, so that the rotational position of the rotor and the corresponding exciting phase(s) coincide with each other at some timing (at some phase), and the output signals of the encoder is counted upon the rotation of the rotor to learn a relationship among the count value of the encoder, the rotational position of the rotor and the exciting phase(s) at the end of the initial drive operation. Thereafter, in a normal drive operation, the rotational position of the rotor is sensed based on the encoder count value with reference to the result of the learning made at the end of the initial drive operation to determine the corresponding exciting phase(s).

The rotational amount (the rotational angle) of the motor is converted to the rotational amount of an output shaft (the operational amount of a range change mechanism) through a rotation transmission system, such as the speed reducing mechanism. Here, it should be noted that looseness (a play) exists between adjacent components of the rotation transmission system. For example, a play (backlash) exists between adjacent gears of the speed reducing mechanism. Furthermore, in a case where a connecting portion, which has a non-circular cross section (e.g., a polygonal cross section, a D-cut cross section) and is provided to a distal end portion of a rotatable shaft of the speed reducing mechanism, is fitted into an engaging hole of the output shaft, a clearance is required to ease the fitting work for fitting the connecting portion of the rotatable shaft into the engaging hole of the output shaft. As discussed above, since the looseness exists in the rotation transmission system, which converts the rotational amount (the rotational angle) of the motor into the operational amount of the control subject, the rotation of the rotor in the initial drive operation may possibly be executed within a range of the looseness (play), or the motor may be held in the state where the load is applied to the motor upon abutment to one of two delimiting positions (side walls), which define a range of the looseness (play), in the middle of the initial drive operation. When the motor is held in the state where the load is applied to the motor in the initial drive operation, the rotor may possibly not be rotated to the position, which corresponds to the exciting phase(s), even at the end of the initial drive operation, thereby possibly resulting in erroneous learning.

SUMMARY OF THE INVENTION

The present invention addresses the above disadvantage. Thus, it is an objective of the present invention to provide a motor control apparatus, which can limit erroneous learning in an initial position learning process executed during an initial drive operation right after turning on of an electric power source.

To achieve the objective of the present invention, there is provided a motor control apparatus that controls rotation of a rotor of an electric motor, which has a plurality of windings to form a plurality of phases and is powered from an electric power source. The motor control apparatus controls rotation of a rotor of an electric motor, which has a plurality of phases and is powered from an electric power source. The motor control apparatus includes an encoder, a learning means and a control means. The encoder outputs an A-phase signal and a B-phase signal at predetermined angular intervals in response to the rotation of the rotor such that a predetermined phase difference is created between the A-phase signal and the B-phase signal. The learning means is for executing an initial position learning process. At time of executing the initial position learning process, the learning means sequentially changes each current exciting phase among the plurality of phases through one complete cycle at a predetermined time schedule during an initial drive operation after turning on of the electric power source, so that a rotational position of the rotor and its corresponding exciting phase coincide with each other at some timing during the initial drive operation, and thereby the rotor is rotated, and the learning means counts the A-phase signal and the B-phase signal during the rotation of the rotor in the initial drive operation and learns a relationship among a count value of the A-phase signal and the B-phase signal counted by the learning means, a rotational position of the rotor and each exciting one of the plurality of phases at an end of the initial drive operation. The learning means determines whether a result of the learning of the learning means is erroneous based on a pattern of the A-phase signal and the B-phase signal at the end of the initial drive operation. When the learning means determines that the result of the learning of the learning means is erroneous, the learning means re-executes the initial position learning process by re-executing the initial drive operation. The control means is for driving the rotor. The control means determines a current rotational position of the rotor based on a current count value of the A-phase single and the B-phase signal with reference to the result of the learning of the learning means and sequentially changes each current exciting phase among the plurality of phases based on the current rotational position of the rotor in a normal drive operation after the end of the initial drive operation

BRIEF DESCRIPTION OF THE DRAWINGS

The invention, together with additional objectives, features and advantages thereof, will be best understood from the following description, the appended claims and the accompanying drawings in which:

FIG. 13A is a time chart showing outputs for various phases at time of learning in a normal state;

FIG. 13B is a diagram showing a relationship between a position of a rotor of the SR motor and the encoder in a V and W-phase excitation in the normal state;

FIG. 13C is a time chart showing outputs for the various phases at time of learning in a state where a load is applied to the rotor of the SR motor;

FIG. 13D is a diagram showing a relationship between a position of the rotor of the SR motor and the encoder in the V and W-phase excitation in the state where the load is applied to the rotor of the SR motor;

DETAILED DESCRIPTION OF THE INVENTION

First and second embodiments of the present invention implemented in a range change apparatus of an automatic transmission will be described with reference to the accompanying drawings.

First Embodiment

A first embodiment of the present invention will be described with reference to FIGS. 1 to 13D.

Figure 1:
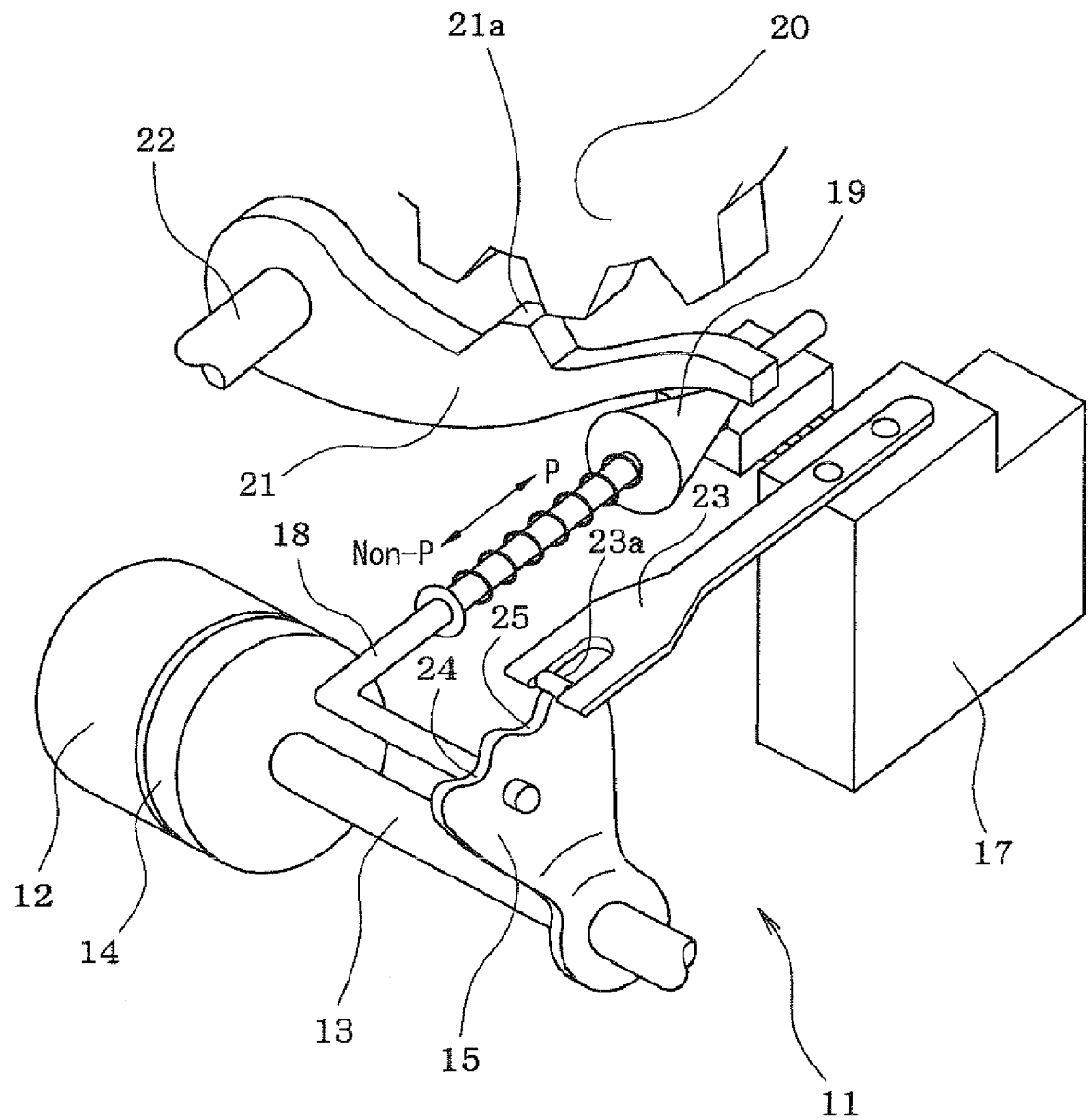
FIG. 1 is a perspective view of a range change apparatus according to a first embodiment of the present invention.

First, a structure of a range change mechanism 11 will be schematically described with reference to FIG. 1.

An electric motor 12, which serves as a drive source of the range change mechanism 11, may be, for example, a switched reluctance motor. The motor 12 includes a speed reducing mechanism 26 (see FIG. 4), which reduces a rotational speed of a rotor of the motor 12. Furthermore, an output shaft sensor 14 is provided to the motor 12 to sense a rotational position of an output shaft 13 of the motor 12. A detent lever 15 is fixed to the output shaft 13.

A parking rod 18, which is configured into an L-shape, is fixed to the detent lever 15. A conical body 19, which is provided at a distal end portion of the parking rod 18, contacts a lock lever 21. The lock lever 21 is pivoted upward or downward about a shaft 22 depending on a position of the conical body 19 to lock or unlock a parking gear 20. The parking gear 20 is provided to an output shaft of the automatic transmission 27. When the parking gear 20 is locked by the lock lever 21, a driving wheel of the vehicle is held in a non-rotatable state (a parking state).

A detent spring 23 is fixed to a support base 17 to hold the detent lever 15 to a parking range (hereinafter, referred to as a P-range) as well as to another range (hereinafter, referred to as a Non-P-range). When an engaging portion 23a, which is provided to a distal end of the detent spring 23, is fitted into a P-range holding recess 24 of the detent lever 15, the detent lever 15 is held in a position of the P-range. Alternatively, when the engaging portion 23a of the detent spring 23 is fitted into a Non-P-range holding recess 25 of the detent lever 15, the detent lever 15 is held in a position of the Non-P-range.

In the P-range, the parking rod 18 is moved toward the lock lever 21, so that a large diameter portion of the conical body 19 pushes the lock lever 21 upward. Thereby, a protrusion 21a of the lock lever 21 is received in the parking gear 20 to lock the parking gear 20. In this way, the output shaft (the drive wheel) of the automatic transmission 27 is placed in the locked state (the parking state).

In the Non-P-range, the parking rod 18 is moved in a direction away from the lock lever 21. Thereby, the large diameter portion of the conical body 19 is removed from the lock lever 21, so that the lock lever 21 is pivoted downward. In this way, the protrusion 21a of the lock lever 21 is released from the parking gear 20 to unlock the parking gear 20. Therefore, the output shaft of the automatic transmission 27 is held in the rotatable state (drivable state of the vehicle).

The output shaft sensor 14 is a rotation sensor (e.g., a potentiometer), which outputs a voltage that corresponds to a rotational angle of the output shaft 13 of the speed reducing mechanism 26 of the motor 12. Based on the output voltage of the output shaft sensor 14, it is possible to determine which one of the P-range and the Non-P-range is the current range.

Figure 2:
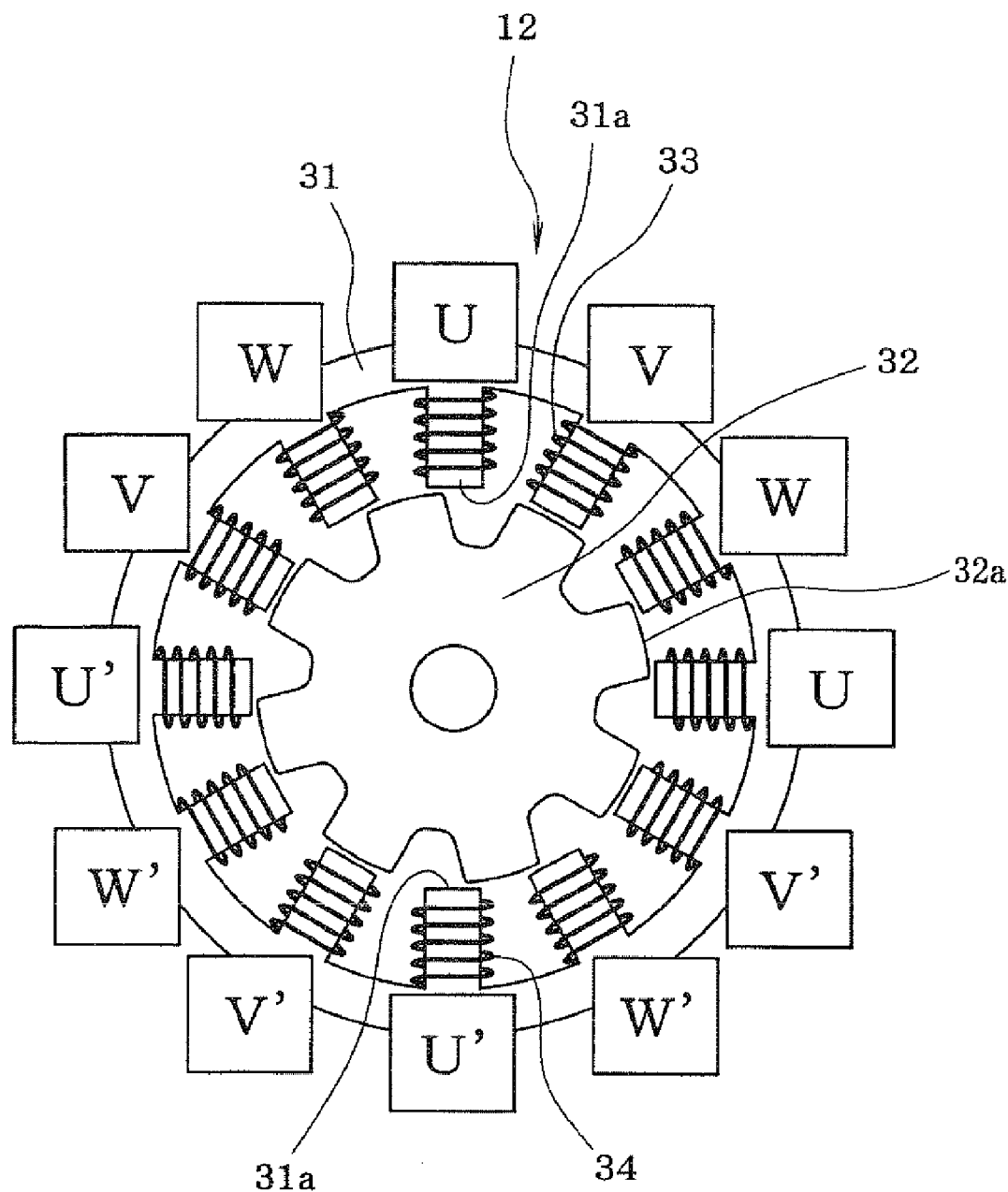
FIG. 2 is a diagram showing a structure of an SR motor of the range change apparatus of the first embodiment.

Next, a structure of the motor 12 will be described with reference to FIG. 2.

In the first embodiment, the switched reluctance motor (hereinafter, referred to as a SR motor) is used as the motor 12. In the SR motor 12, both of a stator 31 and a rotor 32 have salient poles, so that a permanent magnet is not required, thereby implementing the simple structure.

For example, twelve salient poles 31a are arranged one after another at generally equal intervals at an inner peripheral portion of the cylindrical stator 31. Furthermore, for example, eight salient poles 32a are arranged one after another at generally equal intervals at an outer peripheral portion of the rotor 32. When the rotor 32 is rotated, each of the salient poles 32a of the rotor 32 is displaced to sequentially radially oppose the respective salient poles 31a of the stator 31 while a minute gap is interposed between the salient pole 32a of the rotor 32 and the opposed salient pole 31a of the stator 32.

Six windings 33 of a U-phase, a V-phase and a W-phase and six windings 34 of a U'-phase, a V'-phase and a W'-phase are wound sequentially at the twelve salient poles 31a of the stator 31. It should be understood that the number of the salient poles 31a of the stator 31 and the number of the salient poles 32a of the rotor 32 may be changed to any other suitable numbers.

Figure 3:
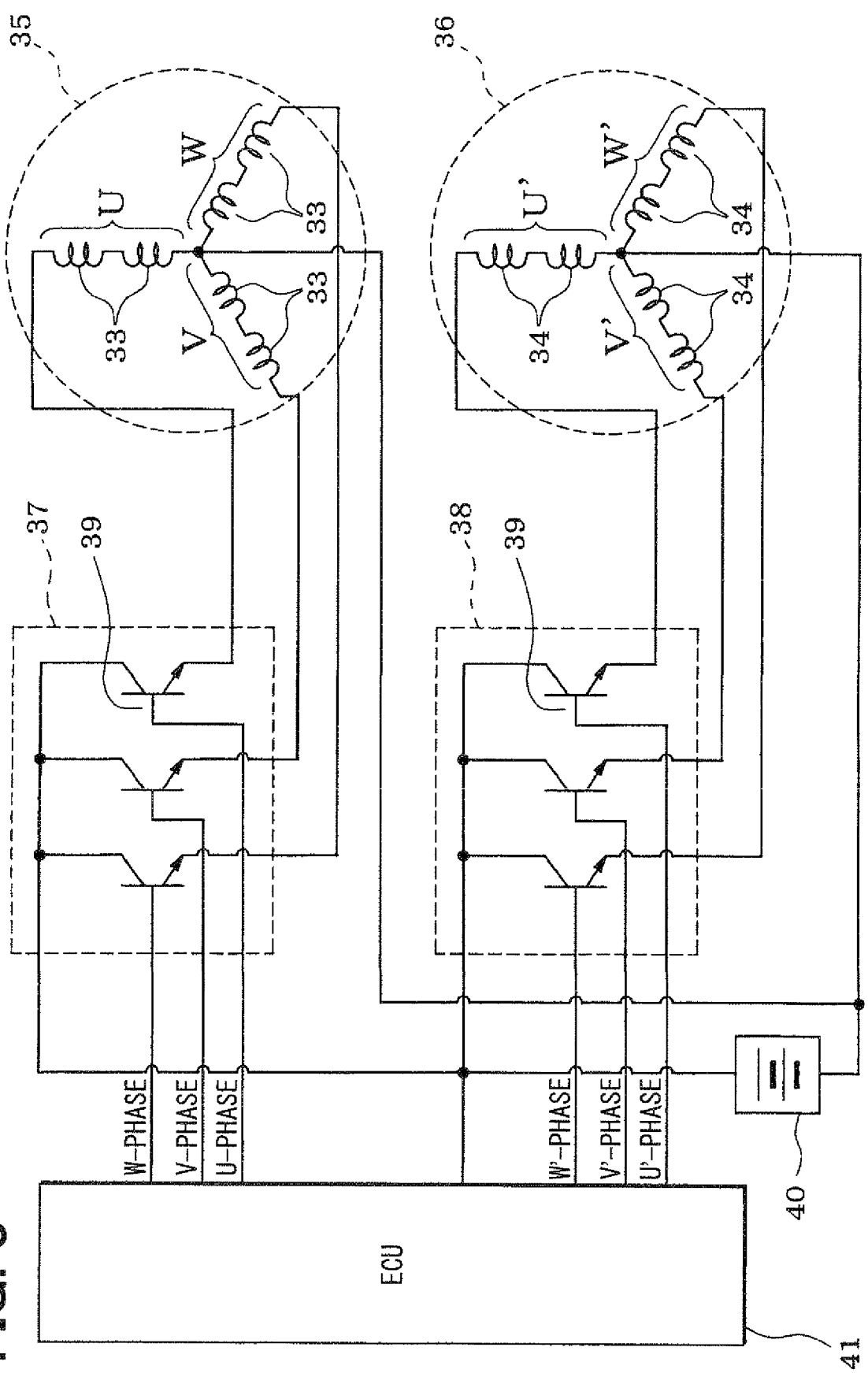
FIG. 3 is a circuit diagram showing a circuit structure, which drives the SR motor, according to the first embodiment.

In the first embodiment, the winding sequence of the windings 33, 34 relative to the twelve salient poles 31a is in an order of the V-phase, the W-phase, the U-phase, the V-phase, the W-phase, the U-phase, the V'-phase, the W'-phase, the U'-phase, the V'-phase, the W'-phase and the U'-phase. As shown in FIG. 3, the six windings 33 of the U-phase, the V-phase and the W-phase and the six windings 33 of the U'-phase, the V'-phase and the W'-phase are electrically connected to form two systems of motor exciting arrangements 35, 36.

In the one motor exciting arrangement 35, the six windings 33 of the U-phase, the V-phase and the W-phase are electrically connected to form a Y-connection (two windings 33 of the same phase being connected in series). In the other motor exciting arrangement 36, the six windings 34 of the U'-phase, the V'-phase and the W'-phase are electrically connected to form a Y-connection (two windings 34 of the same phase being connected in series). In the two motor exciting arrangements 35, 36, the U-phase and the U'-phase are energized simultaneously, and the V-phase and the V'-phase are energized simultaneously. Furthermore, the W-phase and the W'-phase are energized simultaneously.

These two motor exciting arrangements 35, 36 are driven by separate motor drivers 37, 38, respectively, while a battery 40 of the vehicle is used as an electric power source. As discussed above, in the case where the two systems of the motor exciting arrangements 35, 36 and of the motor drivers 37, 38 are provided, even when one of the two systems fails, the other one of the two systems can be used to rotate the SR motor 12. In the exemplary circuit structure of the motor drivers 37, 38 shown in FIG. 3, there is provided a unipolar drive circuit structure, in which one switching element (e.g., a transistor) 39 is provided for each of the phases. Alternatively, it is possible to provide a bipolar drive circuit structure, in which two switching elements are provided for each of the phases. Also, it should be noted that only one system of the motor exciting arrangement and of the motor driver may be alternatively used.

Figure 4:
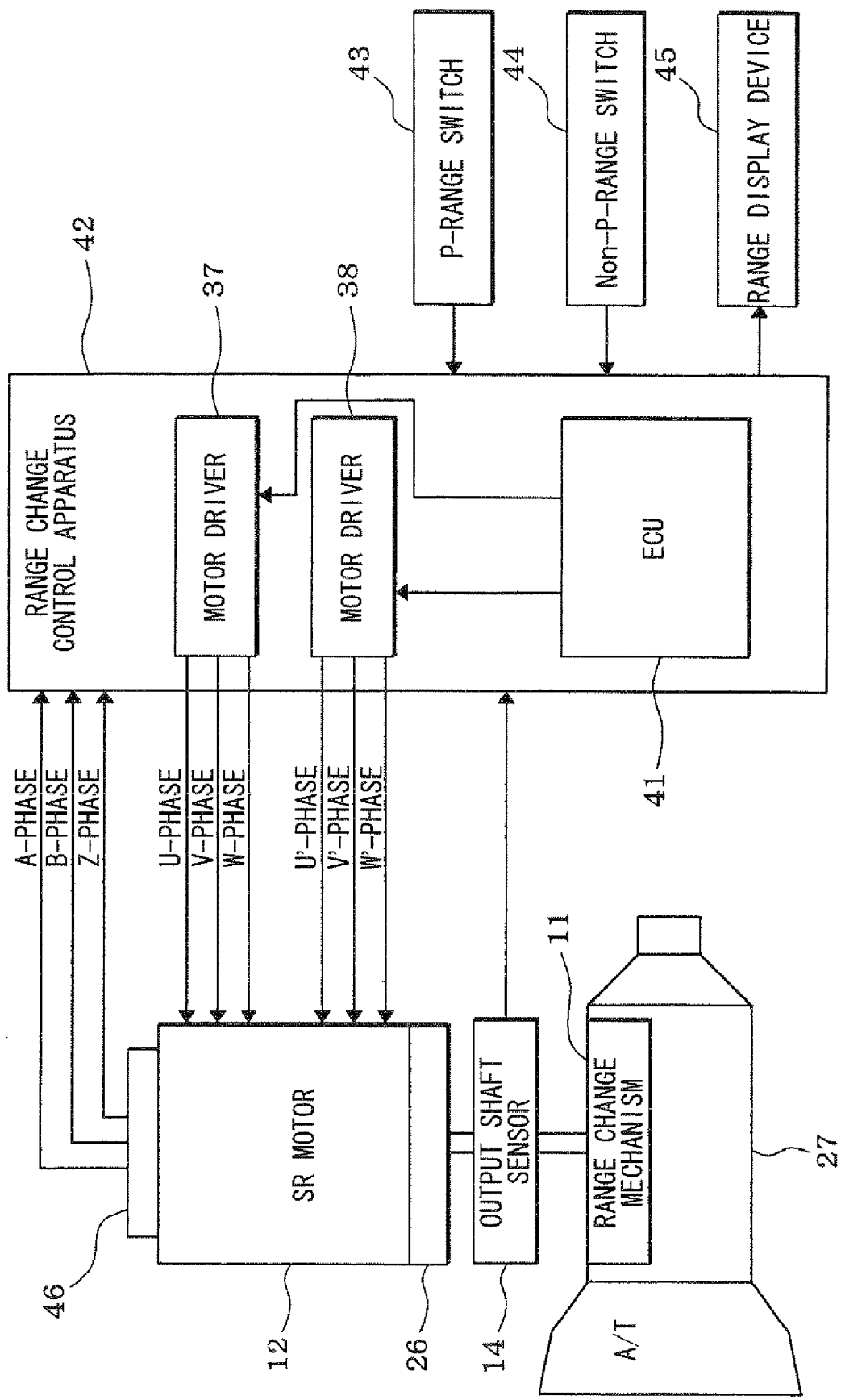
FIG. 4 is a schematic diagram showing an entire control system structure of the range change apparatus according to the first embodiment.

Turning on/off of each switching element 39 of each motor driver 37, 38 is controlled by an ECU 41 (a control means). As shown in FIG. 4, the ECU 41 and the motor drivers 37, 38 are installed in a range change control apparatus 42. An operational signal of a P-range switch 43, which is manipulated to change the range to the P-range, and an operational signal of a Non-P-range switch 44, which is manipulated to change the range to the Non-P-range, are supplied to the range change control apparatus 42. The selected range, which is selected by the manipulation of the P-range switch 43 or the Non-P-range switch 44, is displayed on a range display device 45 that is provided to an instrument panel (not shown).

Figure 5:
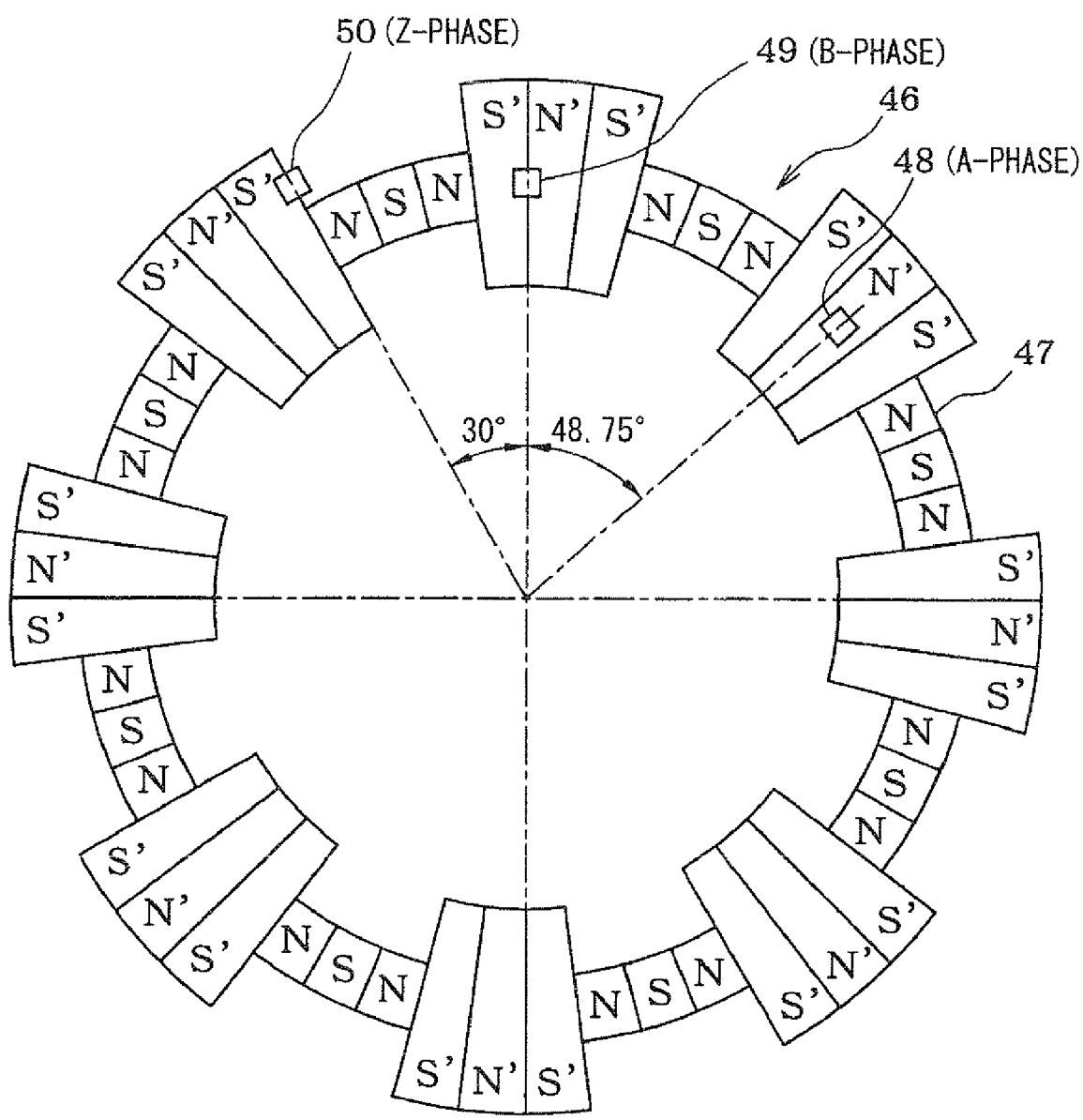
FIG. 5 is a plan view showing a structure of a rotary magnet of an encoder provided to the SR motor of the first embodiment.
Figure 6:
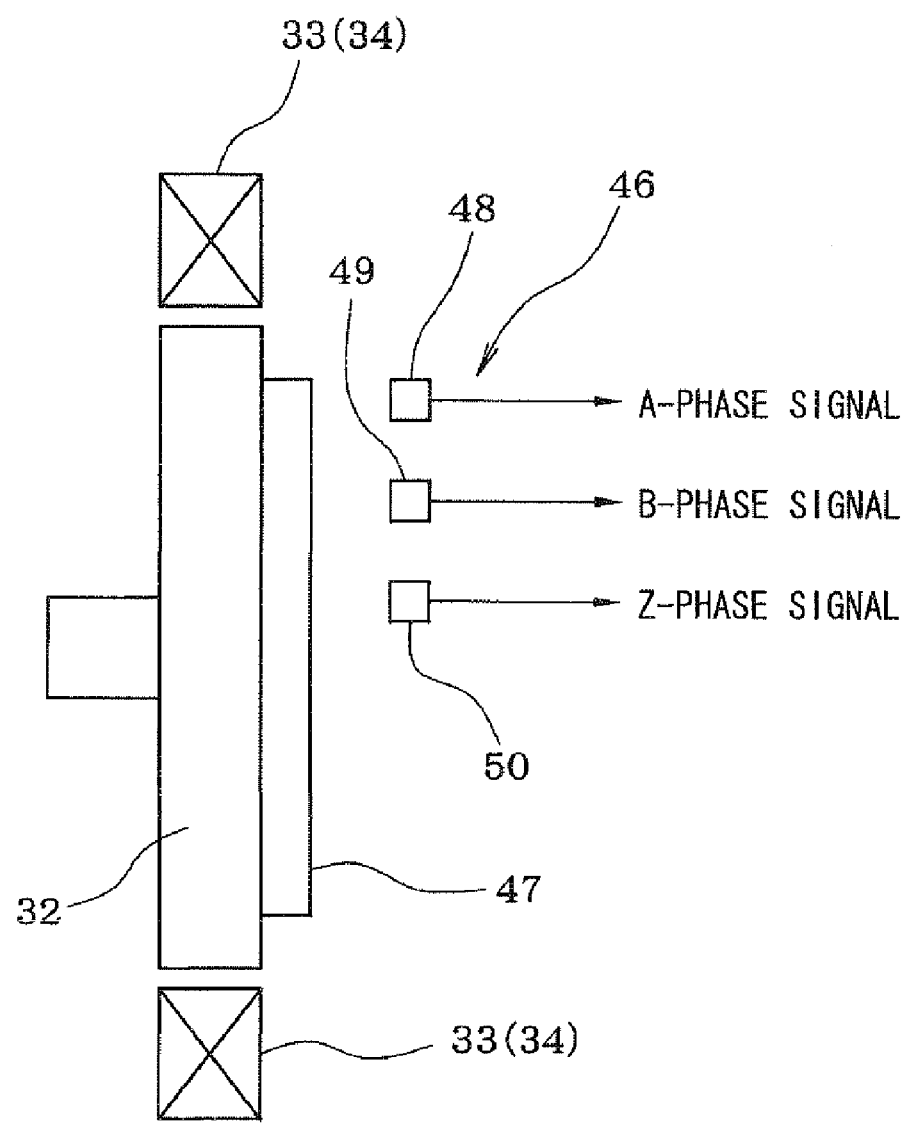
FIG. 6 is a lateral view of the encoder of the first embodiment.

An encoder 46 is provided to the SR motor 12 to sense a rotational position of the rotor 32. The encoder 46 is, for example, a magnetic rotary encoder. Specifically, as shown in FIGS. 5 and 6, an annular rotary magnet 47, in which N-poles and S-poles are alternately arranged one after another at equal pitches in a circumferential direction, is coaxially fixed to a side surface of the rotor 32. Each of three magnetic sensing elements or devices (e.g., three Hall ICs) 48-50 is arranged at a corresponding location that opposes the rotary magnet 47.

In the first embodiment, a pole pitch (a magnetizing pitch) between the adjacent N-pole and S-pole in the rotary magnet 47 is set to be 7.5 degrees. This pole pitch (7.5 degrees) of the rotary magnet 47 is set to be the same angle as the rotational angle of the rotor 32 per excitation of the SR motor 12. As will be described later, when the exciting phase(s) of the SR motor 12 which is being excited, is sequentially changed six times in the 1-2 phase excitation mode, the rotor 32 and the rotary magnet 47 are integrally rotated by 45 degrees (i.e., 7.5 degrees×6=45 degrees). The total number of the N-poles and the S-poles within the rotational angular range of 45 degrees of the rotary magnet 47 is 6 poles.

Furthermore, a radial width of each of N-poles (N'-poles), which are located at positions that correspond to reference rotational positions, respectively, of the rotor 32, is wider than other remaining N poles. Also, a radial width of each of two adjacent S poles (S'-poles), which are located on a clockwise side and a counterclockwise side, respectively, of the corresponding N-pole (N'-pole) located in the corresponding reference rotational position, is larger than other remaining S poles. In the first embodiment, the wide magnetized portions (N'), which are respectively located at the positions that correspond to the reference rotational positions of the rotor 32, are placed one after another at 45 degree pitches in view of the fact that the rotor 32 and the rotary magnet 47 are rotated integrally by 45 degrees at the time of changing the exciting phase(s) of the SR motor 12 through one complete cycle (through one complete turn). Because of the above reason, the eight wide magnetized portions (N'), which correspond to the reference rotational positions, respectively, are provided. Here, it should be noted the number of the wide magnetized portions (N') is not limited to eight. For example, only one wide magnetized portion (N') may be provided throughout the entire rotary magnet 47.

Figure 7A:
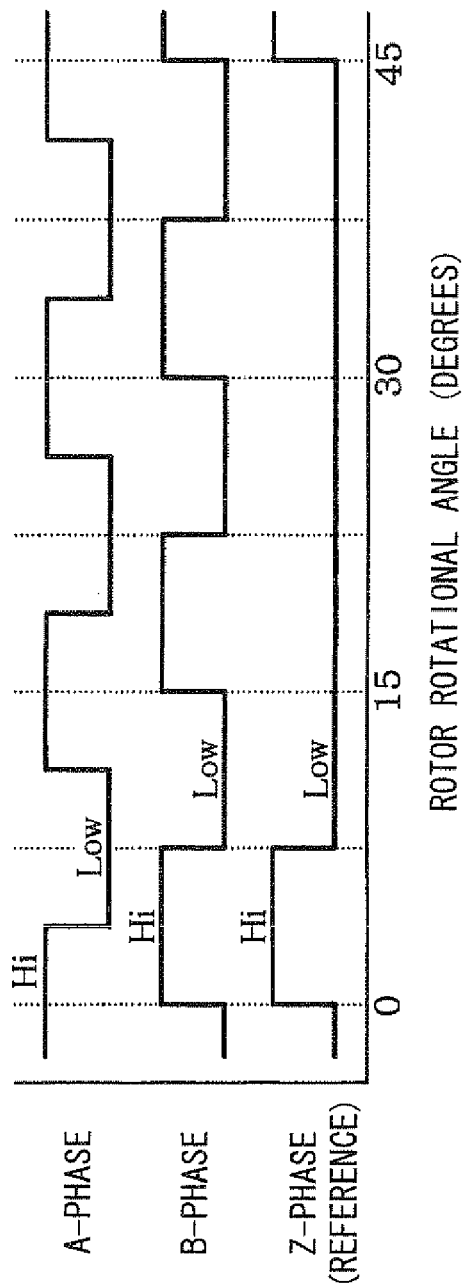
FIG. 7A is a time chart showing an output waveform of the encoder of the first embodiment.

The three magnetic sensing elements 48-50 are arranged to have the following relationship relative to the rotary magnet 47. The magnetic sensing element 48, which outputs the A-phase signal, and the magnetic sensing element 49, which outputs the B-phase signal, are placed along a common imaginary circle such that these two magnetic sensing elements 48, 49 can oppose each of the narrow magnetizing portions (N, S) and the wide magnetizing portions (N', S') of the rotary magnet 47 upon rotation of the rotary magnet 47. In contrast, the magnetic sensing element 50, which outputs the Z-phase signal (the reference signal), is placed radially outward or radially inward of the narrow magnetized portions (N, S) of the rotary magnet 47 such that the magnetic sensing element 50 can oppose each of only the wide magnetized portions (N', S') upon rotation of the rotary magnet 47. An interval between the magnetic sensing element 48 and the magnetic sensing element 49, which output the A-phase signal and the B-phase signal, respectively, is set such that an electrical angle of a phase difference between the A-phase signal and the B-phase signal is 90 degrees (a mechanical angle of 3.75 degrees) as shown in FIG. 7A. Here, the electrical angle is an angle defined in a case where one signal generation period of the A-phase signal and of the B-shape signal is set to 360 degrees. The mechanical angle is an angle defined in a case where one rotation of the rotor 32 is set to 360 degrees. The rotational angle of the rotor 32 from the falling edge (or the rising edge) of the A-phase signal to the falling edge (or the rising edge) of the B-phase signal corresponds to the mechanical angle of the phase difference between the A-phase signal and the B-phase signal. Furthermore, the magnetic sensing element 50, which outputs the Z-phase signal, is placed such that a phase difference between the Z-phase signal and the B-phase signal (or the A-phase signal) becomes zero (0).

The output of each of the magnetic sensing elements 48-50 becomes the high (Hi) level when the magnetic sensing element 48-50 is opposed to the N-pole (N'-pole), and the output of each of the magnetic sensing elements 48-50 becomes the low (Low) level when the magnetic sensing element 48-50 is opposed to the S-pole (S'-pole).

Every time when the magnetic sensing element 50, which outputs the Z-phase single, is opposed to the wide N'-pole, which corresponds to the reference rotational position of the rotor 32, the output of the magnetic sensing element 50 becomes the high (Hi) level. In the location other than this, the output of the magnetic sensing element 50 becomes the low (Low) level.

In the first embodiment, the ECU 41 functions as a control means. The ECU 41 counts the A-phase signal and the B-phase signal, more specifically, counts the rising edges and falling edges of the A-phase signal and the rising edges and falling edges of the B-phase signal. The exciting phase(s) of the SR motor 12 is sequentially changed based on this encoder count value to rotate the rotor 32. At this time, the rotational direction of the rotor 32 of the motor 12 is determined based on the generating order of the A-phase and B-phase signals (i.e., based on which one of the A-phase signal and the B-phase signal is generated first). In the case of the normal rotation (i.e., the rotation in the rotational direction of the P-range to the Non-P-range), the encoder count value is counted up. On the other hand, in the case of the reverse rotation (i.e., the rotation in the rotational direction of the Non-P-range to the P-range), the encoder count value is counted down. In this way, even when the rotor 32 is rotated in any one of the normal rotational direction and the reverse rotational direction, the relationship between the encoder count value and the rotational position of the rotor 32 is maintained. Thus, even when the rotor 32 is rotated in any one of the normal rotational direction and the reverse rotational direction, the rotational position (the rotational angle) of the rotor 32 can be sensed based on the encoder count value. Then, based on the sensed rotational position of the rotor 32, the windings 33, 34, which correspond to the sensed rotational position of the rotor 32, are energized to rotate the rotor 32.

Figure 7B:
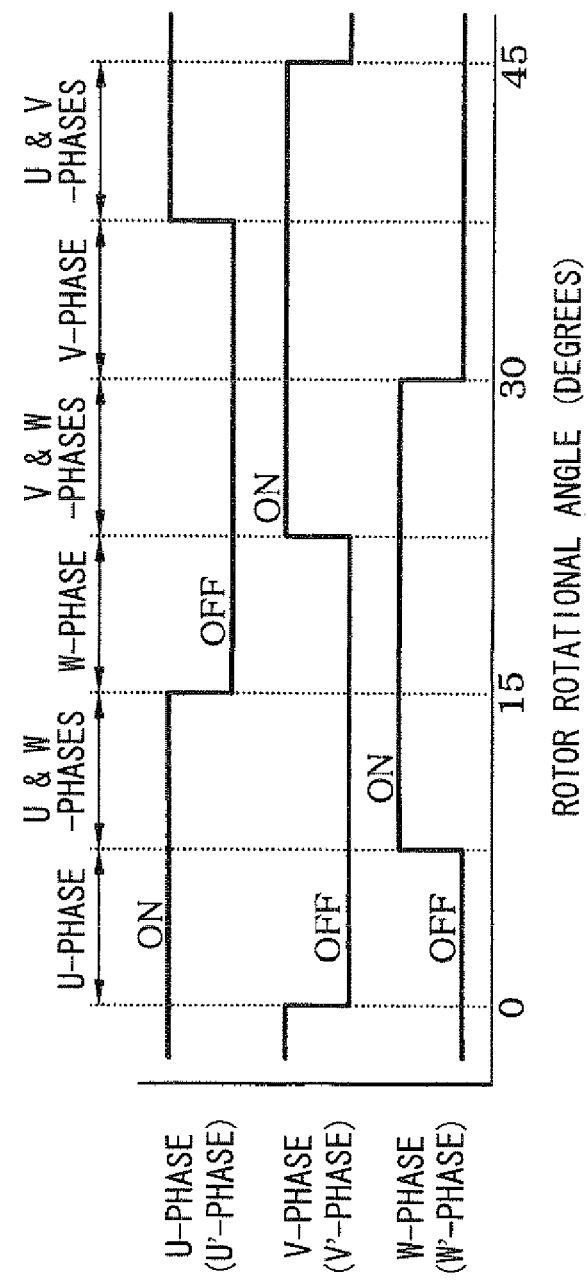
FIG. 7B is a time chart showing a change pattern of an exciting phase(s) of the SR motor according to the first embodiment.

FIGS. 7A and 7B show the output waveform of the encoder 46 and the change pattern of the exciting phase(s) of the SR motor 12, respectively, at the time of rotating the rotor 32 in the reverse rotational direction (the rotational direction from the Non-P-range to the P-range). In any of the reverse rotational direction (the rotational direction from the Non-P-range to the P-range) and the normal rotational direction (the rotational direction from the P-range to the Non-P-range), every time when the rotor 32 is rotated by 7.5 degrees, switching between the 1-phase excitation and the 2-phase excitation takes place. For example, when the rotor 32 is rotated by 45 degrees, the exciting phase(s) is changed through one complete cycle in the order of the U-phase excitation, the U and W-phase excitation, the W-phase excitation, the V and W-phase excitation, the V-phase excitation, and the U and V-phase excitation.

Every time when the exciting phase(s) is changed, the rotor 32 is rotated by 7.5 degrees. Therefore, the magnetic pole of the rotary magnet 47, which is opposed the corresponding one of the magnetic sensing elements 48, 49 that output the A-phase signal and the B-phase signal, respectively, is changed from the N-pole to the S-pole (the N'-pole to the S'-pole) or the S-pole to the N-pole (the S'-pole to the N'-pole). Thereby, the level of the A-phase single and the level of the B-phase signal are alternately reversed. As a result, every time when the rotor 32 is rotated by 7.5 degrees, the encoder count value is counted up (or counted down) by 2. Furthermore, every time when the exiting phase(s) is changed sequentially through one complete cycle to rotate the rotor 32 by 45 degrees, the magnetic sensing element 50, which outputs the Z-phase signal, is opposed to the corresponding wide N'-pole, which corresponds to the reference rotational position of the rotor 32, and thereby the Z-phase signal becomes the high (Hi) level. In this specification, the state of achieving the high (Hi) level of the A-phase signal is sometimes rephrased that the A-phase signal is outputted. Similarly, the state of achieving the high (Hi) level of the B-phase signal is sometimes rephrased that the B-phase signal is outputted. Likewise, the state of achieving the high (Hi) level of the Z-phase signal is sometimes rephrased that the Z-phase signal is outputted.

The encoder count value is stored in the RAM of the ECU 41. Therefore, when the electric power source of the ECU 41 is turned off, the stored encoder count value is lost. Therefore, the encoder count value (0) right after the turning on of the electric power source of the ECU 41 may not correspond to the actual rotational position (exciting phase) of the rotor 32. Thus, in order to change the exciting phase(s) in conformity with the encoder count value, an initial position learning process is required to learn the relationship between the encoder count value and the exciting phase(s) upon coinciding between the encoder count value and the actual rotational position of the rotor 32 after turning on of the electric power source.

Figure 8:
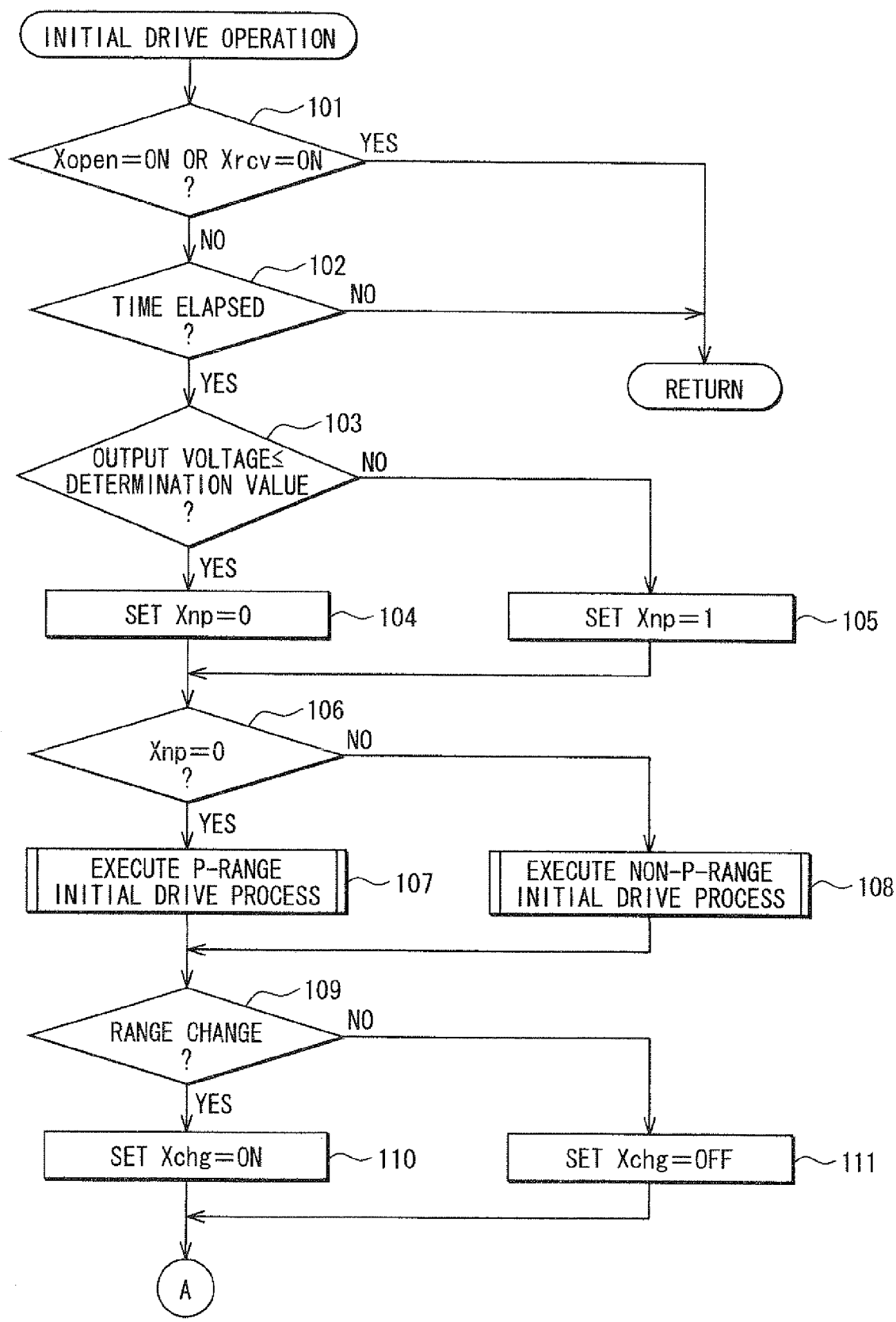
FIG. 8 is a flowchart showing a first part of an initial drive operation routine according to the first embodiment.
Figure 9:
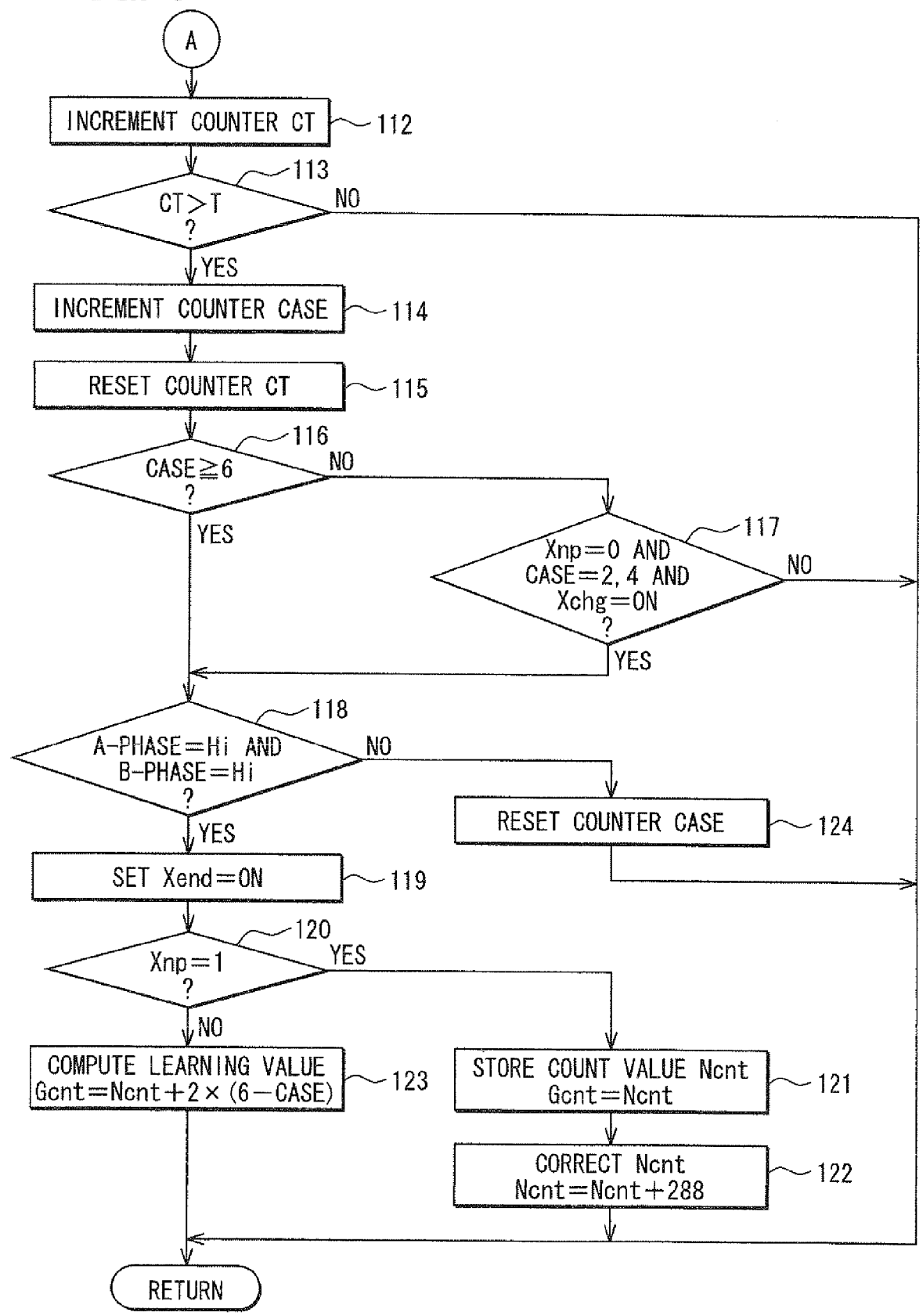
FIG. 9 is a flowchart showing a second part of the initial drive operation routine according to the first embodiment.

Because of the above need, in the first embodiment, the ECU 41 of the range change control apparatus 42 executes an initial drive operation routine shown in FIGS. 8 and 9. Thus, in the initial drive operation period after the turning on of the electric power source of the ECU 41, the exciting phase(s) of the SR motor 12 is sequentially changed through one complete cycle at a predetermined time schedule in the 1-2 phase excitation mode. Therefore, at some exciting phase(s), i.e., at some timing, during the initial drive operation period, the rotational position of the rotor 32 is synchronized with, i.e., is coincided with the corresponding exciting phase(s), and thereby the rotor 32 is rotated. At this time, the edges of the A-phase signal and the edges of the B-phase signal are both counted. Then, the relationship among the encoder count value, the rotational position of the rotor 32 and the exciting phase(s) at the end of the initial drive operation is learned. Thereafter, during the normal drive operation, each corresponding exciting phase is determined based on the encoder count value and the result of the learning at the end of the initial drive operation.

The initial position learning process in the initial drive operation is performed as follows.

Figure 12:
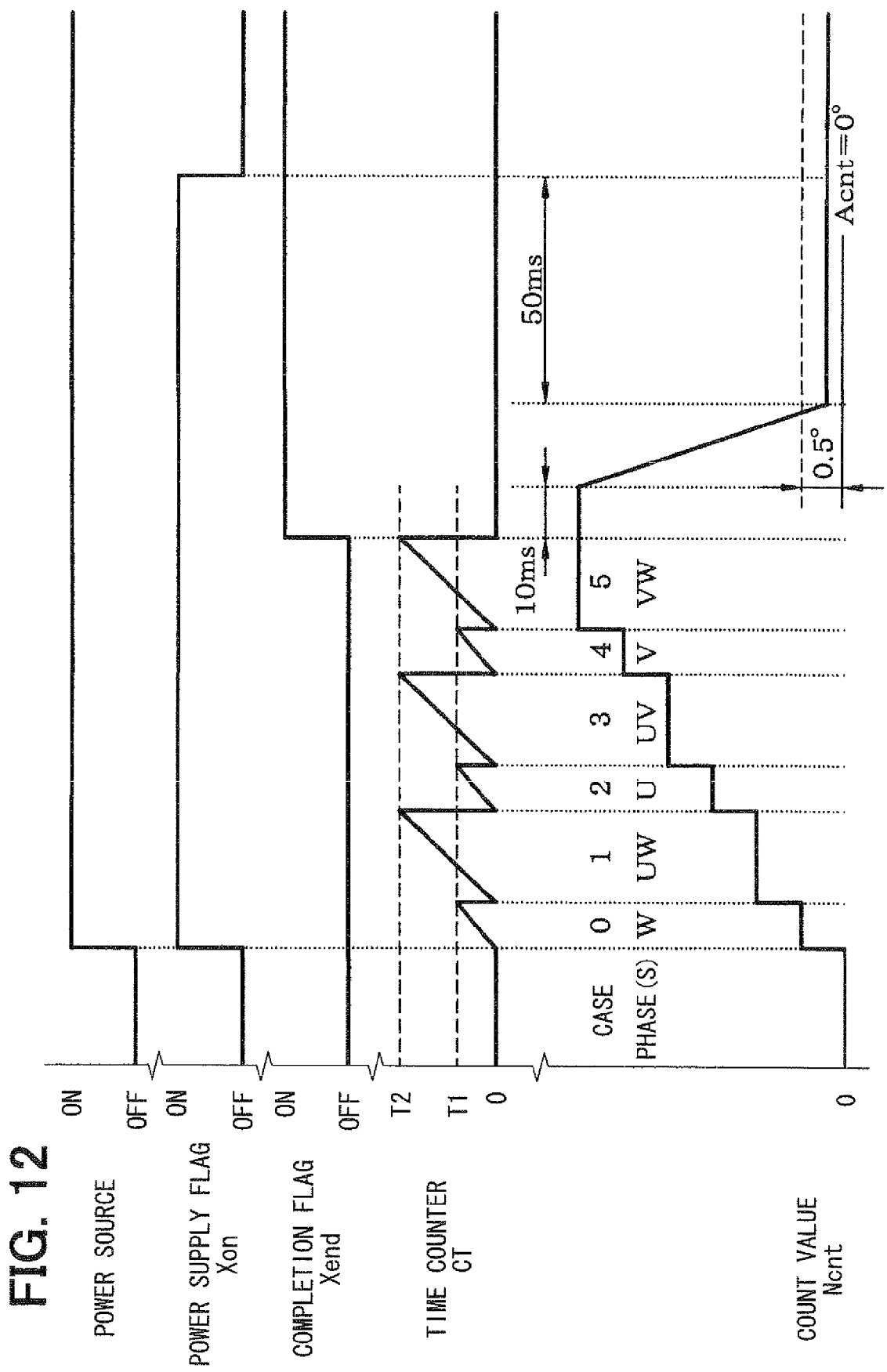
FIG. 12 is a time chart showing an exemplary control operation at the time of starting an initial drive operation at a P-range of an automatic transmission according to the first embodiment.

As shown in FIG. 12, in the case where the initial drive operation is started after the turning on of the electric power source of the ECU 41 at the P-range of the automatic transmission 27, the exciting phase(s) is sequentially changed through one complete cycle at the predetermined time schedule in the order of the W-phase excitation, the U and W-phase excitation, the U-phase excitation, the U and V-phase excitation, the V-phase excitation, and the V and W-phase excitation, so that the rotor 32 is rotated in the normal rotational direction (the rotational direction of the P-range to the Non-P-range).

In contrast, in the case where the initial drive operation is started after the turning on of the electric power source of the ECU 41 at the Non-P-range of the automatic transmission 27, the exciting phase(s) is sequentially changed through one complete cycle at the predetermined time schedule in the order of V-phase excitation, the U and V-phase excitation, the U-phase excitation, the U and W-phase excitation, the W-phase excitation, and the V and W-phase excitation, so that the rotor 32 is rotated in the reverse rotational direction (the rotational direction of the Non-P-range to the P-range).

In this initial drive operation period, a time period of each 1-phase excitation is set to be shorter than a time period T2 of each 2-phase excitation (e.g., T1=10 ms and T2=100 ms). Even in the case where the rotational position of the rotor 32 and the corresponding exciting phase(s) are synchronized with each other during the initial drive operation, the rotor 32 tends to vibrate during each 1 phase excitation where the generated torque is relatively small. In view of this, the time period T1 of each 1 phase excitation is shortened to immediately shift to the following 2 phase excitation. In this way, the vibrations of the rotor 32 are rapidly damped to stabilize the output signal of the encoder 46.

As discussed above, when the exciting phase is sequentially changed through one complete cycle during the initial drive operation, the rotational position of the rotor 32 and the corresponding exciting phase(s) are coincided with each other at some exciting phase(s). Thereafter, the rotor 32 is rotated synchronously with the exciting phase change process, and the A-phase signal and the B-phase signal are outputted from the encoder 46 synchronously with the rotation of the rotor 32.

During the initial drive operation, the rising edges and falling edges of the A-phase signal and of the B-phase signal are counted. Therefore, by checking the encoder count value at the end of the initial drive operation, the actual rotational angle (the actual rotational amount) of the rotor 32, which is rotated synchronously with the progress of the exciting phase change process, can be identified. Based on this angle of rotation (the actual amount of rotation), the relationship between the encoder count value, the rotational position of the rotor 32 and the exciting phase(s) at the end of the initial drive operation can be identified (determined).

In the exemplary case of FIG. 12, in the initial drive operation, the rotor 32 is rotated starting from the initial exciting phase (the W-phase). Furthermore, every time when the exciting phase(s) is changed, the rotor 32 is rotated by 7.5 degrees, and the encoder count value is counted up by 2. Therefore, at the end of the initial drive operation, the encoder count value becomes 12.

In contrast, in a case where the rotor 3 is not rotated in the initial three excitations (the W-phase excitation, the U and W-phase excitation, and the U-phase excitation in this order), i.e., in a case where the rotational position of the rotor 32 and the corresponding exciting phase(s) are synchronized at and after the fourth excitation (the U and V-phase excitation, the V-phase excitation, and the V and W-phase excitation) to cause rotation of the rotor 32 by the amount corresponding to the three excitations, the rotor 32 is rotated by 22.5 degrees (i.e., 7.5 degrees×3=22.5 degrees). Thus, the encoder count value becomes 6 (i.e., 2×3=6). Thereby, by checking the encoder count value at the end of the initial drive operation, it is possible to identify the actual rotational angle (the actual rotational amount) of the rotor 32, which is rotated synchronously with the sequential change of the exciting phase(s) until the end of the initial drive operation.

In the last excitation during the initial drive operation, the V and W phases (2 phases) are excited as the last exciting phases. However, the last encoder count value is not necessary 12. That is, in some cases, the last encoder count value may be, for example, 8 or 4. During the normal drive operation after the initial drive operation, each corresponding exciting phase is determined based on the encoder count value. Thus, if the deviation of the encoder count value is not corrected in the initial drive operation, the correct exciting phase(s) cannot be selected during the normal drive operation.

Thereby, according to the first embodiment, the encoder count value at the end of the initial drive operation is learned as an initial position deviation learning value. Thereafter, the encoder count value is corrected by the initial position deviation learning value during the normal drive operation. In this way, the deviation between the encoder count value and the corresponding exciting phase(s) (the corresponding rotational position of the rotor 32) is corrected, and thereby the correct exciting phase(s) can be selected during the normal drive operation.

After the initial drive operation, as shown in FIG. 12, the electric current is supplied for, for example, 10 ms to the same phases, which are the same as the last exciting phases, i.e., the V and W-phases at the end of the initial drive operation, to hold the rotor 32 at the last position of the rotor 32 at the end of the initial drive operation. Thereafter, the exciting phase is changed through feedback control based on the encoder count value and the initial position deviation learning value obtained at that time point, so that the rotor 32 is rotated in the direction toward a target position Acnt. In this way, when the rotational position (the encoder count value) of the rotor 32 reaches a range within, for example, 0.5 degrees from the target position Acnt, the sequential change of the exciting phase(s) is terminated to stop the rotor 32. Thereafter, the electric current is kept supplied to the same phase(s) to maintain the stop state of the rotor 32. For example, this state may be maintained for 50 ms. Thereafter, when the target position Acnt does not change, the supply of the electric current to the phase(s) is terminated.

The rotational amount (rotational angle) of the motor 12 is converted into the rotational amount of the output shaft 13 (the operational amount of the range change mechanism 11) through the rotation transmission system, which includes the speed reducing mechanism 26. Here, it should be noted that a play (looseness) exists between the components of the rotation transmission system. For example, a play (backlash) exists between adjacent gears of the speed reducing mechanism 26. Furthermore, in a case where a connecting portion, which has a non-circular cross section (e.g., a polygonal cross section, a D-cut cross section) and is provided to a distal end portion of the rotatable shaft of the speed reducing mechanism 26, is fitted into an engaging hole of the output shaft 13, a clearance is required to ease the fitting work for fitting the connecting portion of the rotatable shaft into the engaging hole of the output shaft 13. As described above, the looseness (play) exists in the rotation transmission system, which converts the rotational amount (the rotational angle) of the motor 12 into the operational amount of the range change mechanism 11, which is the control subject. Therefore, the rotation of the rotor 32 during the initial drive operation may possibly be executed within the range of the looseness (play), or the motor 12 may be held in the state where the load is applied to the motor 12 upon abutment to one of two delimiting positions (side walls), which define a range of the looseness (play), in the middle of the initial drive operation. If the motor 12 is held in the state where the load is applied to the motor 12 in the initial drive operation, the rotor 32 may not possibly be rotated to the corresponding position, which corresponds to the current exciting phase(s), by the end of the initial drive operation, thereby possibly resulting in erroneous learning.

Therefore, according to the first embodiment, it is determined whether the result of the learning is correct based on the pattern of the A-phase signal and the B-phase signal of the encoder 46 at the end of the initial drive operation. When it is determined that the result of the learning is incorrect, i.e., is erroneous, the initial drive operation is re-executed to re-execute the initial position learning process.

In order to implement this erroneous learning limiting control function, as discussed above, the rotor 32 is driven in the 1-2 phase excitation mode in the initial drive operation and is stopped to terminate the initial drive operation at the position where the two phases are excited. When the pattern of the A-phase signal and the B-phase signal of the encoder 46 at the end of the initial drive operation does not match the pattern, which should be made at the time of exciting the two phases, it is determined that the result of the learning is incorrect (erroneous).

Specifically, as shown in FIGS. 13A and 13B, when the rotor 32 is rotated normally in the initial drive operation and is stopped to terminate the initial drive operation at the position where the two phases are excited (i.e., where the two phase excitation is executed), both of the A-phase signal and the B-phase signal of the encoder 46 show the high (Hi) level at the end of the initial drive operation (at the learning timing) regardless of whether the two phase excitation, which is executed at the end of the initial drive operation, is of the U and W-phase excitation, the U and V-phase excitation, and the V and W-phase excitation. However, as shown in FIGS. 13C and 13D, when the rotor 32 is rotated abnormally due to the allocation of the load to the rotor 32, one or both of the A-phase signal and the B-phase signal of the encoder 46 would show the low (Low) level at the end of the initial drive operation (at the learning timing). In the case of FIGS. 13C and 13D, only the A-phase signal shows the low (Low) level at the end of the initial drive operation (at the learning timing). Because of the above relationship, according to the first embodiment, if both of the A-phase signal and the B-phase signal of the encoder 46 show the high (Hi) level at the end of the initial drive operation (at the learning timing), it is determined that the result of the learning is correct. In contrast, if one or both of the A-phase signal and the B-phase signal of the encoder 46 show the low (Low) level at the end of the initial drive operation (at the learning timing), it is determined that the result of the learning is incorrect (erroneous learning).

The initial position learning process in the initial drive operation is executed by the ECU 41 of the range change control apparatus 42 according to the initial drive operation routine shown in FIGS. 8 and 9. Right after the turning on of the electric power source of the ECU 41 (right after the turning on of the ignition switch), this routine is executed at predetermined intervals (e.g., 1 ms intervals) until the end of the initial drive operation and serves as a learning means.

When the routine is started, at step 101, it is determined whether an open loop control execution flag Xopen is ON (i.e., Xopen=ON) or a recovery process execution flag Xrcv is ON (i.e., Xrcv=ON). The open loop control execution flag Xopen is a flag that indicates whether an open loop control process (a fail-safe process) is executed. The open loop control process is executed when the encoder 46 or the SR motor 12 fails. When the open loop control process execution flag Xopen is ON, it indicates that the open loop control process is currently executed. The recovery process execution flag Xrcv is a flag that indicates whether a recovery process (the open loop control process) is executed. The recovery process (the open loop control process) is executed temporarily when a temporary operational abnormality occurs. When the recovery process execution flag Xrcv is ON, it indicates that the recovery process (the open loop control process) is currently executed.

When Yes is returned at step 101, the present routine is terminated without executing any further steps. In contrast, when No is returned at step 101, control proceeds to step 102. At step 102, it is determined whether a predetermined time period (e.g., 100 ms), which is required to stabilize an output voltage of the output shaft sensor 14, has been elapsed since an initial process of the ECU 41. When it is determined that the predetermined time period has elapsed since the initial process at step 102 (i.e., Yes at step 102), control proceeds to step 103. At step 103, the output voltage of the output shaft sensor 14 is read (obtained), and it is determined whether the output voltage of the output shaft sensor 14 is equal to or less than a range determination value. When the output voltage of the output shaft sensor 14 is equal to or less than the range determination value, it is determined that the current range is the P-range. In contrast, when the output voltage of the output shaft sensor 14 is larger than the range determination value, it is determined that the current range is the Non-P-range. When Yes is returned at step 103, i.e., when the current range is the P-range, control proceeds to step 104 where a range determination flag Xnp is set to 0 (zero), which indicates the P-range. In contrast, when No is returned at step 103, i.e., when the current range is the Non-P-range, control proceeds to step 105 where the range determination flag Xnp is set to 1, which indicates the Non-P-range.

Figure 10:
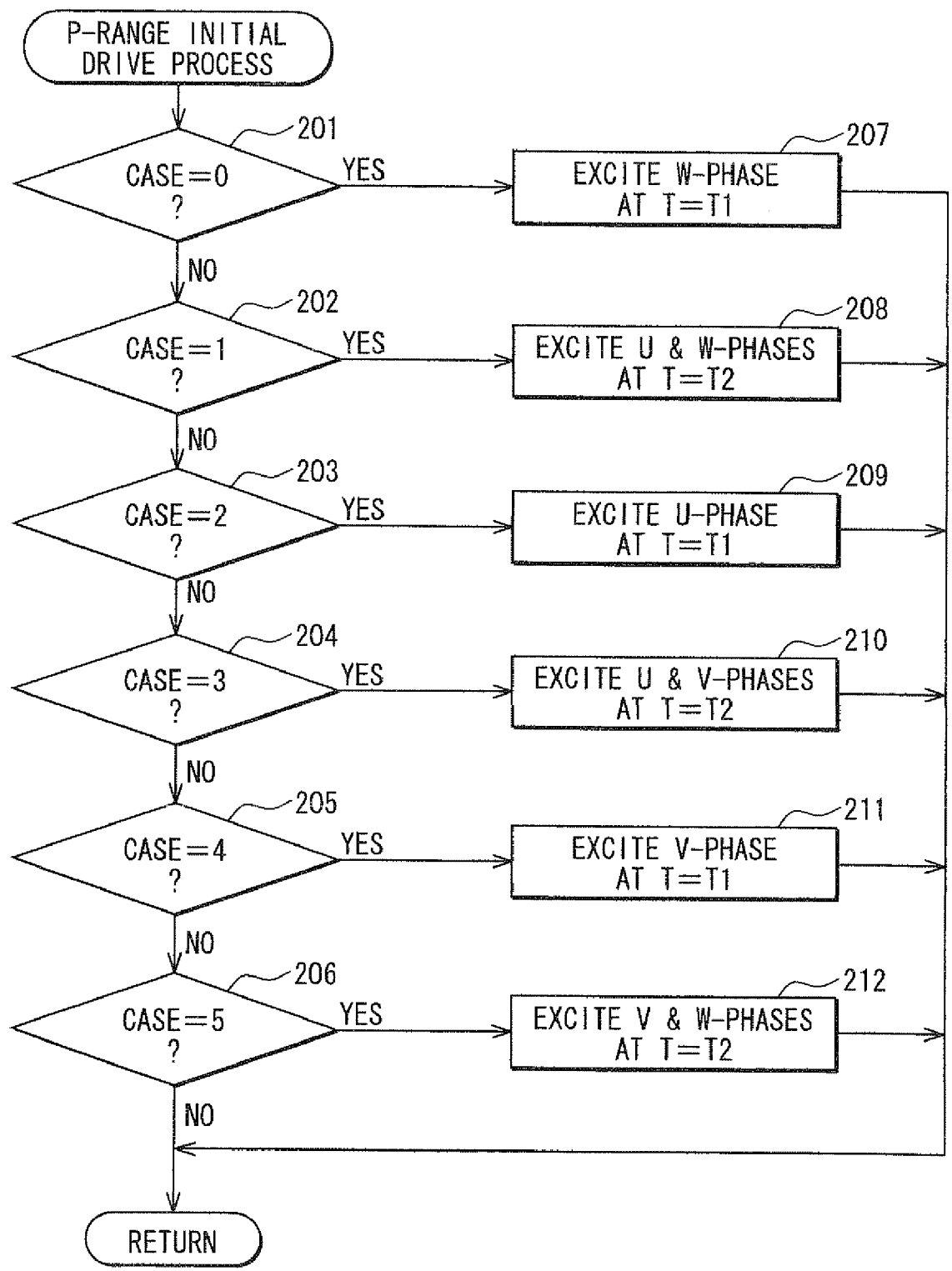
FIG. 10 is a flowchart showing a flow of a P-range initial drive process routine according to the first embodiment.
Figure 11:
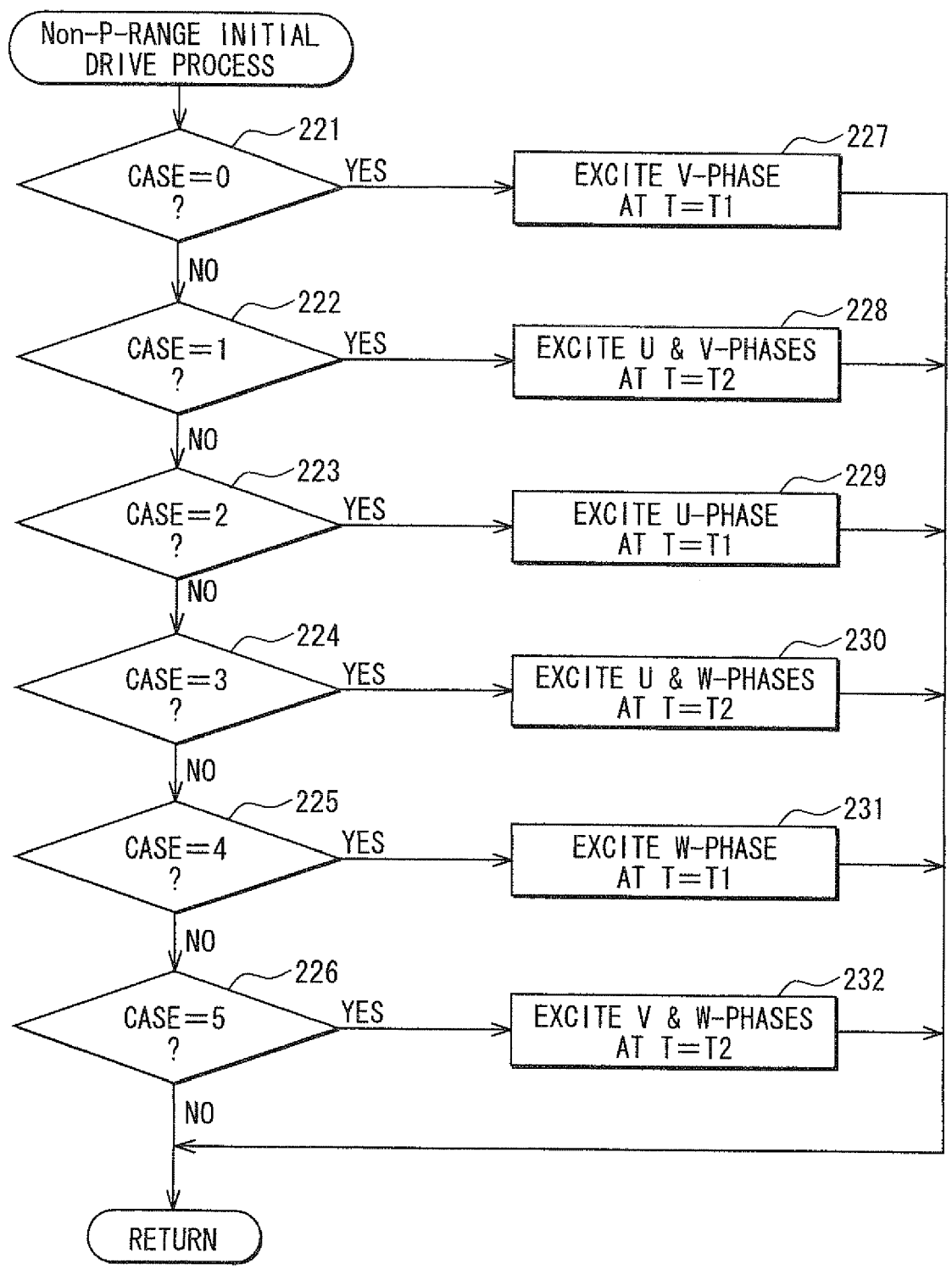
FIG. 11 is a flowchart showing a flow of a Non-P-range initial drive process routine according to the first embodiment.

Thereafter, control proceeds to step 106. At step 106, it is determined whether the range determination flag Xnp is 0 (i.e., Xnp=0), i.e., whether the current range is the P-range. When it is determined that the range determination flag Xnp is 0 (i.e., Xnp=0), i.e., the current range is the P-range at step 106, control proceeds to step 107 where a P-range initial drive process routine shown in FIG. 10 is executed. In contrast, when it is determined that the range determination flag Xnp is 1 (i.e., Xnp=1), i.e., the current range is the Non-P-range at step 106, control proceeds to step 108 where a Non-P-range initial drive process routine shown in FIG. 11 is executed.

When the P-range initial drive process routine of FIG. 10 is started, it is determined whether a count value of an excitation execution number counter CASE, which counts the number of executions of the excitation during the initial drive operation, is 0, 1, 2, 3, 4 or 5 at steps 201-206. The count value of the excitation execution number counter CASE is initialized to an initial value of 0 in the initial process. Thereafter, every time when the excitation is executed, the count value of the excitation execution number counter CASE is counted up, i.e., incremented by 1 (step 114 in FIG. 9). Then, based on the result of the determination of the count value of the excitation execution number counter CASE, the exciting phase(s) and a excitation time period (energization time period) T are set as follows.

In the case where the count value of the excitation execution number counter CASE is 0 (i.e., CASE=0, which indicates the first excitation), control proceeds to step 207 where the W-phase excitation is selected, and the excitation time period T is set to T1 (e.g., 10 ms).

In the case where the count value of the excitation execution number counter CASE is 1 (i.e., CASE=1, which indicates the second excitation), control proceeds to step 208 where the U and W-phase excitation is selected, and the excitation time period T is set to T2 (e.g., 100 ms).

In the case where the count value of the excitation execution number counter CASE is 2 (i.e., CASE=2, which indicates the third excitation), control proceeds to step 209 where the U-phase excitation is selected, and the excitation time period T is set to T1 (e.g., 10 ms).

In the case where the count value of the excitation execution number counter CASE is 3 (i.e., CASE=3, which indicates the fourth excitation), control proceeds to step 210 where the U and V-phase excitation is selected, and the excitation time period T is set to T2 (e.g., 100 ms).

In the case where the count value of the excitation execution number counter CASE is 4 (i.e., CASE=4, which indicates the fifth excitation), control proceeds to step 211 where the V-phase excitation is selected, and the excitation time period T is set to T1 (e.g., 10 ms).

In the case where the count value of the excitation execution number counter CASE is 5 (i.e., CASE=5, which indicates the sixth excitation), control proceeds to step 212 where the V and W-phase excitation is selected, and the excitation time period T is set to T2 (e.g., 100 ms).

In this way, in the case where the initial drive operation is started at the P-range of the automatic transmission 27, the exciting phase(s) is sequentially changed through one complete cycle in the order of the W-phase excitation, the U and W-phase excitation, the U-phase excitation, the U and V-phase excitation, the V-phase excitation, and the V and W-phase excitation, so that the rotor 32 is rotated in the normal rotational direction (the rotational direction of the P-range to the Non-P-range). At this time, the time period T1 for the 1 phase excitation is set to be shorter than the time period T2 for the 2 phase excitation.

In contrast, when the Non-P-range initial drive process routine shown in FIG. 11 is started at step 108, it is determined whether the count value of the excitation execution number counter CASE is 0, 1, 2, 3, 4 or 5 at steps 221 to 226. Based on the result of this determination, the exciting phase(s) and the excitation time period T are set as follows.

In the case where the count value of the excitation execution number counter CASE is 0 (i.e., CASE=0, which indicates the first excitation), control proceeds to step 227 where the V-phase excitation is selected, and the excitation time period T is set to T1 (e.g., 10 ms).

In the case where the count value of the excitation execution number counter CASE is 1 (i.e., CASE=1, which indicates the second excitation), control proceeds to step 228 where the U and V-phase excitation is selected, and the excitation time period T is set to T2 (e.g., 100 ms).

In the case where the count value of the excitation execution number counter CASE is 2 (i.e., CASE=2, which indicates the third excitation), control proceeds to step 229 where the U-phase excitation is selected, and the excitation time period T is set to T1 (e.g., 10 ms).

In the case where the count value of the excitation execution number counter CASE is 3 (i.e., CASE=3, which indicates the fourth excitation), control proceeds to step 230 where the U and W-phase excitation is selected, and the excitation time period T is set to T2 (e.g., 100 ms).

In the case where the count value of the excitation execution number counter CASE is 4 (i.e., CASE=4, which indicates the fifth excitation), control proceeds to step 231 where the W-phase excitation is selected, and the excitation time period T is set to T1 (e.g., 10 ms).

In the case where the count value of the excitation execution number counter CASE is 5 (i.e., CASE=5, which indicates the sixth excitation), control proceeds to step 232 where the V and W-phase excitation is selected, and the excitation time period T is set to T2 (e.g., 100 ms).

In this way, in the case where the initial drive operation is started at the Non-P-range of the automatic transmission 27, the exciting phase is changed sequentially through one complete cycle in the order of the V-phase excitation, the U and V-phase excitation, the U-phase excitation, the U and W-phase excitation, the W-phase excitation, and the V and W-phase excitation, so that the rotor 32 is rotated in the reverse rotational direction (the rotational direction of the Non-P-range to the P-range). Also in this case, the time period T1 of the 1 phase excitation is set to be shorter than the time period T2 of the 2 phase excitation.

When the P-range initial drive process routine of FIG. 10 or the Non-P-range initial drive process routine of FIG. 11 is executed in the above described manner, control proceeds to step 109 in FIG. 8. At step 109, it is determined whether the range change operation (the operation of the P-range switch 43 or the operation of the Non-P-range switch 44) is executed in the initial drive operation. When it is determined that the range change operation is executed in the initial drive operation at step 109, control proceeds to step 110 At step 110, a range change operation flag Xchg is set to ON. In contrast, when it is determined that the range change operation is not executed in the initial drive operation at step 109, control proceeds to step 111. At step 111, the range change operation flag Xchg is set to OFF.

Thereafter, control proceeds to step 112 in FIG. 9. At step 112, an excitation time counter CT, which counts the excitation time period of the current exciting phase(s), is counted up. Then, at step 113, it is determined whether the excitation time period of the current exciting phase(s), which is indicated by the excitation time counter CT, has exceeded the excitation time period T (i.e., T1 or T2), which is set in the routine of FIG. 10 or the routine of FIG. 11. When it is determined that the excitation time period of the current exciting phase(s), which is indicated by the excitation time counter CT, has not exceeded the excitation time period T (i.e., T1 or T2), the present routine is terminated without executing any further steps. In this way, the excitation of the current phase(s) is maintained until the excitation time period CT of the current exciting phase(s) exceeds the excitation time period (i.e., T1 or T2), which is set in the routine of FIG. 10 or the routine of FIG. 11.

Thereafter, when the excitation time period CT of the current exciting phase(s) exceeds the excitation time period T (i.e., T1 or T2), which is set in the routine of FIG. 10 or the routine of FIG. 11, control proceeds to step 114. At step 114, the excitation execution number counter CASE is counted up by 1, and the exciting phase(s) is changed to the next phase(s). Then, at step 115, the excitation time counter CT is reset, and control proceeds to step 116. At step 116, it is determined whether the count value of the excitation execution number counter CASE has reached to 6, which indicates the end of the initial drive operation. When it is determined that the count value of the excitation execution number counter CASE has reached to 6 at step 116, control proceeds to step 118. At step 118, it is determined whether the A-phase signal and the B-phase signal are both in the high (Hi) level to determine whether the result of the learning is correct. When it is determined that the A-phase signal and the B-phase signal are both in the high (Hi) level at step 118, it is then determined that the result of the learning is correct. Thus, control proceeds to step 119. At step 119, an initial drive operation completion flag Xend is set to ON, which indicates the completion of the initial drive operation.

In contrast, when No is returned at step 118, i.e., when it is determined that the one or both of the A-phase signal and the B-phase signal is in the low (Low) level, it is determined that the result of the learning is incorrect (erroneous), so that control proceeds to step 124. At step 124, the count value of the excitation execution number counter CASE is reset to 0 (zero). Then, the initial drive operation is re-executed to re-execute the initial position learning process.

In contrast, when it is determined that the count value of the excitation execution number counter CASE has not reached to 6, i.e., it is still in the middle of the initial drive operation, control proceeds to step 117. At step 117, it is determined whether an intermediate termination condition for terminating the initial drive operation in the middle of the initial drive operation is satisfied. The intermediate termination condition is satisfied when the following three conditions (1) to (3) are all satisfied.

(1) The range determination flag Xnp is 0 (zero), i.e., the current range is the P-range.
(2) The count value of the excitation execution number counter CASE is 2 or 4, i.e., it is the end of the 2 phase excitation.
(3) The range change operation flag Xchg is ON, i.e., the range change operation is executed during the initial drive operation.

When any one of the above three conditions (1) to (3) is not satisfied, the intermediate termination condition for terminating the initial drive operation is not satisfied. Therefore, the initial drive operation is continued.

On the other hand, when all of the above three conditions (1) to (3) are satisfied, the intermediate termination condition for terminating the initial drive operation is satisfied. Therefore, control proceeds to step 118. At step 118, it is determined whether the A-phase signal and the B-phase signal are both in the high (Hi) level to determine whether the result of the learning is correct. When it is determined that the A-phase signal and the B-phase signal are both in the high (Hi) level at step 118, it is then determined that the result of the learning is correct. Thus, control proceeds to step 119. At step 119, an initial drive operation completion flag Xend is set to ON, which indicates the completion of the initial drive operation.

In contrast, when No is returned at step 118, i.e., when it is determined that the one or both of the A-phase signal and the B-phase signal is in the low (Low) level, it is determined that the result of the learning is incorrect (erroneous), so that control proceeds to step 124. At step 124, the count value of the excitation execution number counter CASE is reset to 0 (zero). Then, the initial drive operation is re-executed to re-execute the initial position learning process.

When the initial drive operation completion flag Xend is set to ON at step 119, control proceeds to step 120. At step 120, it is determined whether the range determination flag Xnp is 1 (i.e., Xnp=1). In other words, it is determined whether the initial drive operation is started at the Non-P-range of the automatic transmission 27. When it is determined that the range determination flag Xnp is 1 (i.e., Xnp=1), control proceeds to step 121. At step 121, the encoder count value Ncnt at the end of the initial drive operation is stored as the initial position deviation learning value Gcnt. Then, at step 122, the encoder count value Ncnt is corrected to a value, which is obtained through the following equation while the Non-P-range serving as the reference position.

Ncnt=Ncnt+288

In the first embodiment, the holding position of the P-range is set as a 0 (zero) point position, and the encoder count value Ncnt is counted up from this position. When the rotor 32 is rotated to the position, which corresponds to the holding position of the Non-P-range, the encoder count value Ncnt should become, for example, 288. Therefore, in the case where the initial drive operation is started at the Non-P-range of the automatic transmission 27, the encoder count value Ncnt is corrected to the value, which is obtained while using the Non-P-range as the reference position, by adding 288 to the encoder count value Ncnt obtained at the end of the initial drive operation.

In contrast, when it is determined that the range determination flag Xnp is 0 (i.e., Xnp=0) at step 120, that is, when it is determined that the initial drive operation is started at the P-range of the automatic transmission 27 at step 120, control proceeds to step 123. At step 123, the initial position deviation learning value Gcnt is computed through the following equation by using the encoder count value Ncnt obtained at the end of the initial drive operation.

Gcnt=Ncnt+2×(6−CASE)

In this case, when the initial drive operation is completely performed up to the end of the initial drive operation, the count value of the excitation execution number counter CASE should become 6 (i.e., CASE=6) through the process of step 114. Therefore, the encoder count value Ncnt at the end of the initial drive operation becomes the initial position deviation learning value Gcnt. However, in the case where the initial drive operation is started at the P-range of the automatic transmission 27, when the range change operation is executed in the middle of the initial drive operation, the normal drive operation starts after completion of the next 2 phase excitation (in the case where the range change request is made during the execution of the current 2 phase excitation, the normal drive operation starts after completion of this 2 phase excitation). Therefore, the encoder count value Ncnt at the end of the initial drive operation is estimated by assuming that the initial drive operation is completely performed up the end of the initial drive operation, and this estimation value of the encoder count value Ncnt is used as the initial position deviation learning value Gcnt. Here, the value obtained by the equation of 2×(6−CASE) is the count value (hereinafter, referred to as Ncnt correction amount), which corresponds to the rotational angle, which is supposed to be made by the execution of the unfinished excitations.

In the first embodiment, the rotor 32 is driven in the 1-2 phase excitation mode in the initial drive operation and is stopped to terminate the initial drive operation at the position where the two phases are excited. When the pattern of the A-phase signal and the B-phase signal of the encoder 46 at this end of the initial drive operation does not match the pattern, which should be made at the time of exciting the two phases, it is determined that the result of the learning is incorrect (erroneous). In such a case, the initial drive operation is re-executed to re-execute the initial position learning process. Therefore, it is possible to limit the starting of the normal feedback control process using the incorrect result of the learning. That is, the normal feedback control process starts after obtaining the correct result of the learning. As a result, it is possible to improve the reliability of the initial position learning process.

Second Embodiment

Figure 14:
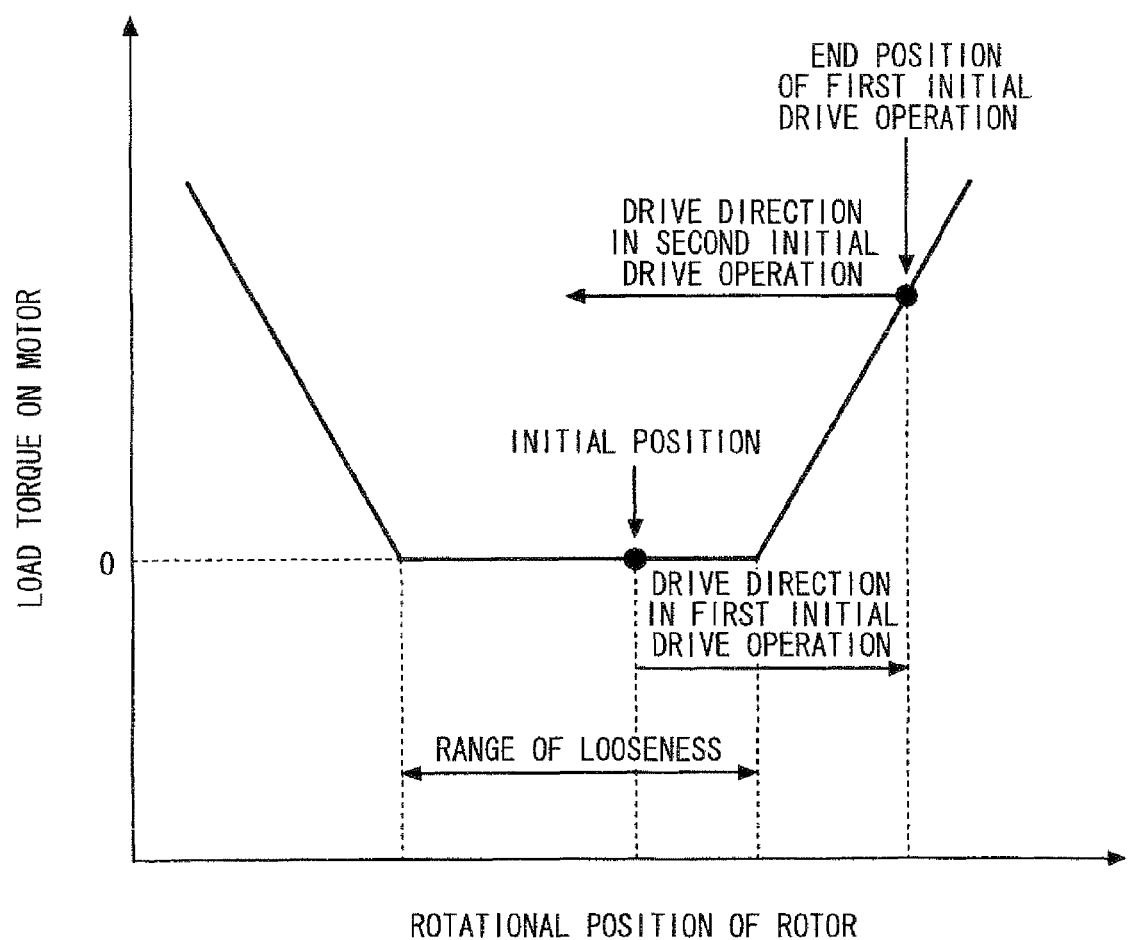
FIG. 14 is a time chart for describing a learning method through the initial drive operation according to a second embodiment of the present invention.

In a second embodiment of the present invention shown in FIGS. 14 to 17, in the case where the initial drive operation is re-executed after it is determined that the result of the learning through the initial drive operation is incorrect (erroneous learning), the initial drive operation is re-executed upon changing the drive direction of the rotor 32 to the opposite drive direction, which is opposite from the drive direction of the rotor 32 in the previous initial drive operation. For example, as shown in FIG. 14, in a case where the erroneous learning occurs due to application of the load to the rotor 32 upon abutment to the one of the delimiting positions (side walls), which define the range of the looseness (play), in the middle of the first initial drive operation, the second initial drive operation is executed by rotating the rotor 32 in the opposite drive direction, which is opposite from that of the first drive operation according to the second embodiment. In this way, the load applied to the rotor 32 is released, and the rotor 32 is rotated within the range of the looseness (play) to correctly learn the relationship among the encoder count value, the rotational position of the rotor 32 and the exciting phase(s).

Figure 15:
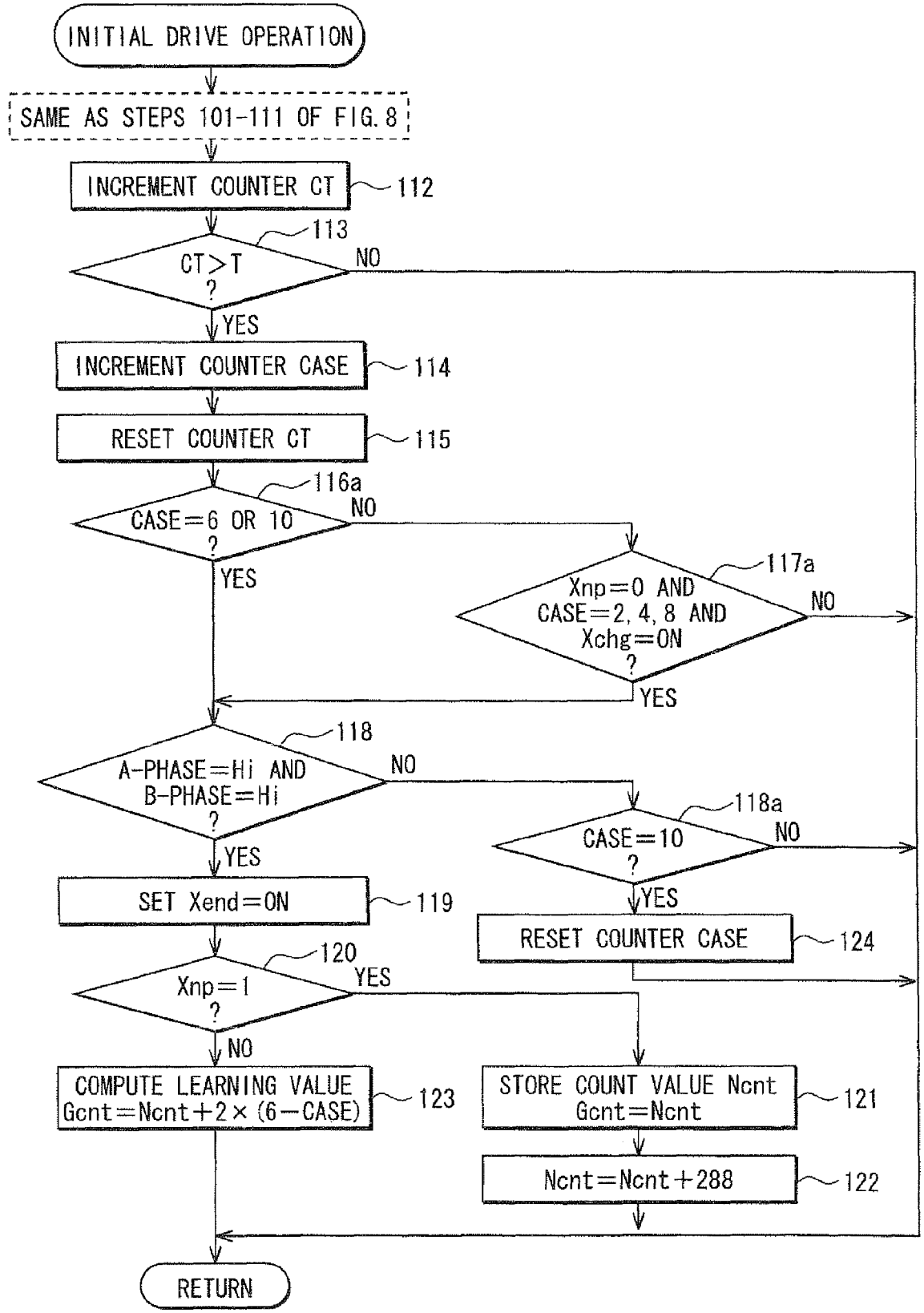
FIG. 15 is a flowchart showing a flow of an initial drive operation routine according to the second embodiment of the present invention.

The initial drive operation of the second embodiment is executed according to the initial drive operation routine shown in FIG. 15.

In the initial drive operation routine of FIG. 15, step 116 and step 117 of the initial drive operation routine of FIGS. 8 and 9 discussed in the first embodiment are replaced with step 116*a* and step 117*a*, respectively, and addition step 118*a* is inserted before step 124. Other than the above points, the initial drive operation routine of FIG. 15 is the same as that of the first embodiment.

Figure 16:
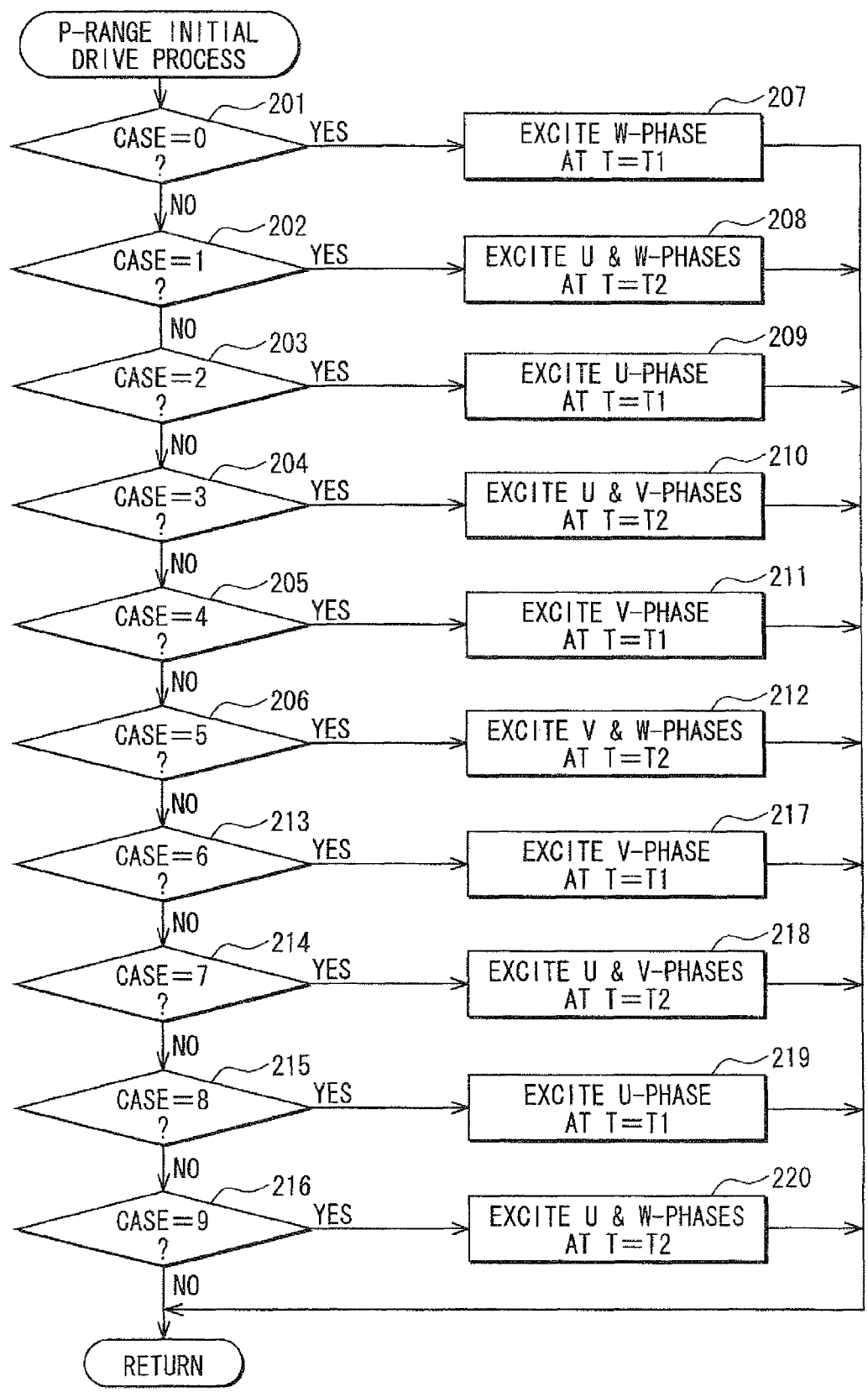
FIG. 16 is a flowchart showing a flow of a P-range initial drive process routine according to the second embodiment.

Furthermore, in the second embodiment, when the initial drive operation is started at the P-range of the automatic transmission 27, the P-range initial drive process routine shown in FIG. 16 is executed Thereby, the first initial drive operation is executed in the manner similar to that of the first embodiment until the count value of the excitation execution number counter CASE is counted up from 0 to 6 (step 201 to step 212). Then, when it is determined that the result of the learning through the first initial drive operation is incorrect (erroneous learning), the second initial drive operation is executed in the opposite drive direction, which is opposite from the drive direction of the first initial drive operation until the count value of the excitation execution number counter CASE is counted up from 6 to 10 (step 213 to step 220). Here, in the case where the first initial drive operation is started at the P-range of the automatic transmission 27, the exciting phase(s) is sequentially changed in the order of the W-phase excitation, the U and W-phase excitation, the U-phase excitation, the U and V-phase excitation, the V-phase excitation, and the V and W-phase excitation to rotate the rotor 32 in the normal rotational direction (the rotational direction of the P-range to the Non-P-range). When it is determined that the result of the learning through the first initial drive operation is incorrect (erroneous learning), the second initial drive operation is executed by changing the exciting phase(s) in the order of the V-phase excitation, the U and V-phase excitation, the U-phase excitation, and the U and W-phase excitation to rotate the rotor 32 in the reverse rotational direction (the rotational direction of the Non-P-range to the P-range).

Figure 17:
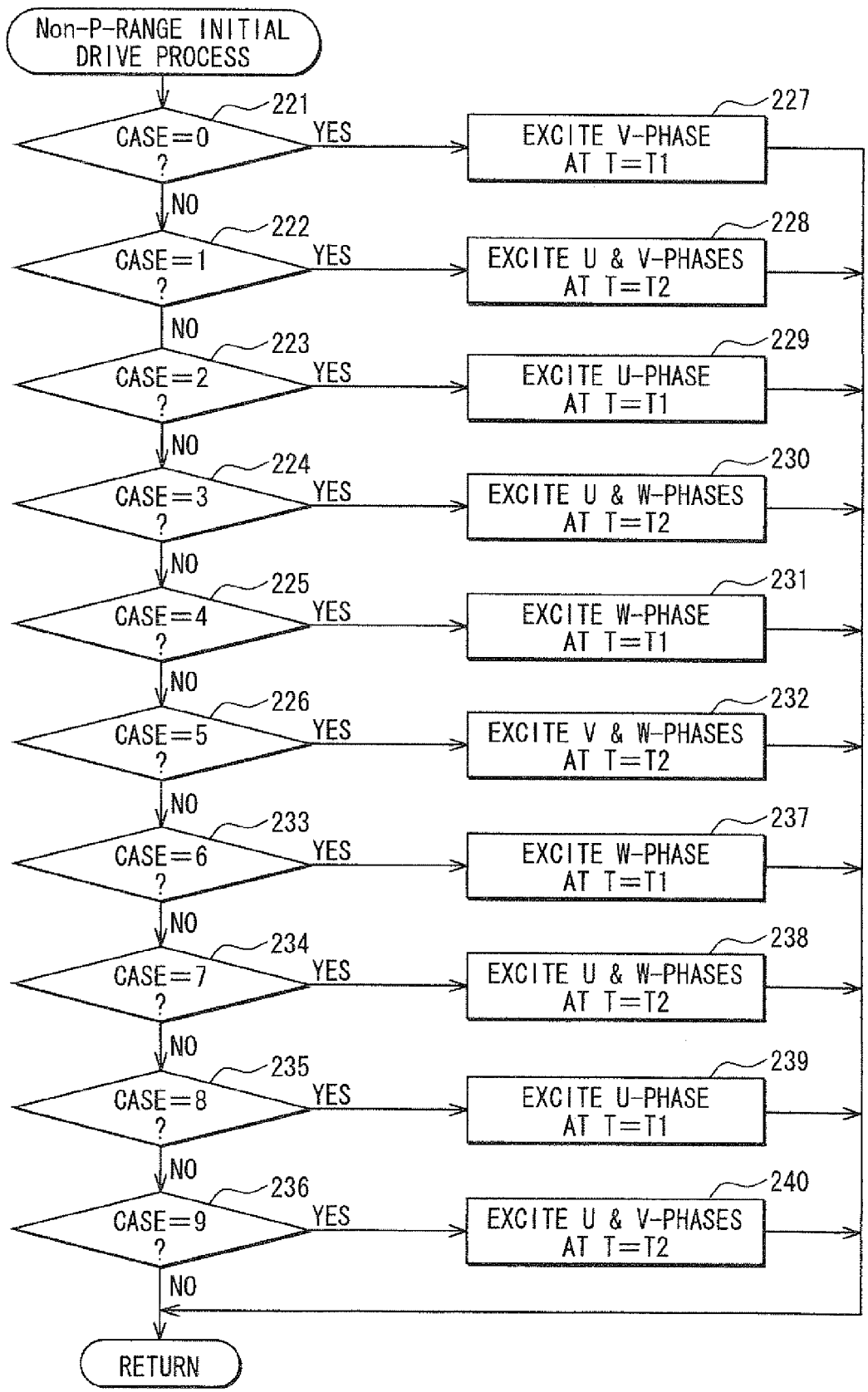
FIG. 17 is a flowchart showing a flow of a Non-P-range initial drive process routine according to the second embodiment.

Furthermore, when the initial drive operation is executed at the Non-P-range of the automatic transmission 27, the Non-P-range initial drive process routine shown in FIG. 17 is executed. Thereby, the first initial drive operation is executed in the manner similar to that of the first embodiment until the count value of the excitation execution number counter CASE is counted up from 0 to 6 (step 221 to step 232). Then, when it is determined that the result of the learning through the first initial drive operation is incorrect (erroneous learn-ing), the second initial drive operation is executed in the opposite drive direction, which is opposite from the drive direction of the first initial drive operation until the count value of the excitation execution number counter CASE is counted up from 6 to 10 (step 233 to step 240). Here, in the case where the first initial drive operation is started at the Non-P-range of the automatic transmission 27, the exciting phase(s) is sequentially changed in the order of the V-phase excitation, the U and V-phase excitation, the U-phase excitation, the U and W-phase excitation, the W-phase excitation, and the V and W-phase excitation to rotate the rotor 32 in the reverse rotational direction (the rotational direction of the Non-P-range to the P-range). When it is determined that the result of the learning through the first initial drive operation is incorrect (erroneous learning), the second initial drive operation is executed by changing the exciting phase(s) in the order of the W-phase excitation, the U and W-phase excitation, the U-phase excitation, and the U and V-phase excitation to rotate the rotor 32 in the normal rotational direction (the rotational direction of the P-range to the Non-P-range). In both of the above cases, the time period T1 of the 1 phase excitation is set to be shorter than the time period T2 of the 2 phase excitation.

In the initial drive operation routine of FIG. 15, every time when the exciting phase(s) is changed to the next exciting phase(s), control proceeds to step 116*a* where it is determined whether the count value of the excitation execution number counter CASE is 6 or 10, which indicates the end of the first initial drive operation or of the second initial drive operation. When it is determined that the count value of the excitation execution number counter CASE is 6 or 10, control proceeds to step 118 where it is determined whether both of the A-phase signal and the B-phase signal are in the high (Hi) level to determine whether the result of the learning is correct When it is determined that the A-phase signal and the B-phase signal are both in the high (HI) level at step 118, it is then determined that the result of the learning is correct. Thus, control proceeds to step 119. At step 119, an initial drive operation completion flag Xend is set to ON, which indicates the completion of the initial drive operation.

In contrast, when No is returned at step 118, i.e., when it is determined that one or both of the A-phase signal and the B-phase signal are in the low (Low) level at step 118, it is determined that the result of the learning is incorrect, and control proceeds to step 118*a*. At step 118*a*, it is determined whether the count value of the excitation execution number counter CASE is 10. When it is determined that the count value of the excitation execution number counter CASE is 10 at step 118*a*, it is determined that it is the end of the second initial drive operation, and thereby control proceeds to step 124. At step 124, the count value of the excitation execution number counter CASE is reset to 0 (zero), and the third initial drive operation is executed by changing the drive direction of the rotor 32 to the opposite drive direction, which is opposite from that of the second initial drive operation. The third initial drive operation is the same as the first initial drive operation. When it is determined that the count value of the excitation execution number counter CASE is not 10 at step 118*a* (i.e., in the case where the count value of the excitation execution number counter CASE is 6), the present routine is terminated without executing any further steps. In this case, the second initial drive operation is executed in the opposite drive direction, which is opposite from that of the first initial drive operation.

In contrast, when it is determined that the count value of the excitation execution number counter CASE is not 6 or 10 at step 116*a* (i.e., in the case where it is in the middle of the first initial drive operation or the second initial drive operation), control proceeds to step 117a. At step 117a, it is determined whether the intermediate termination condition for terminating the initial drive operation in the middle of the initial drive operation is satisfied. The intermediate termination condition is satisfied when the following three conditions (1) to (3) are all satisfied.

(1) The range determination flag Xnp is 0 (zero), i.e., the current range is the P-range.

(2) The count value of the excitation execution number counter CASE is 2, 4 or 8, i.e., it is the end of the 2 phase excitation.

(3) The range change operation flag Xchg is ON, i.e., the range change operation is executed during the initial drive operation.

When any one of the above three conditions (1) to (3) is not satisfied, the intermediate termination condition for terminating the initial drive operation is not satisfied. Therefore, the initial drive operation is continued.

On the other hand, when all of the above three conditions (1) to (3) are satisfied, the intermediate termination condition for terminating the initial drive operation is satisfied. Therefore, control proceeds to step 118. At step 118, it is determined whether the A-phase signal and the B-phase signal are both in the high (Hi) level to determine whether the result of the learning is correct. When it is determined that the A-phase signal and the B-phase signal are both in the high (Hi) level at step 118, it is then determined that the result of the learning is correct. Thus, control proceeds to step 119. At step 119, an initial drive operation completion flag Xend is set to ON, which indicates the completion of the initial drive operation.

In contrast, when No is returned at step 118, i.e., when it is determined that one or both of the A-phase signal and the B-phase signal are in the low (Low) level at step 118, it is determined that the result of the learning is incorrect, and control proceeds to step 118a. At step 118a, it is determined whether the count value of the excitation execution number counter CASE is 10. When it is determined that the count value of the excitation execution number counter CASE is 10 at step 118a, it is determined that it is the end of the second initial drive operation, and thereby control proceeds to step 124. At step 124, the count value of the excitation execution number counter CASE is reset to 0 (zero), and the third initial drive operation is executed by changing the drive direction of the rotor 32 to the opposite drive direction, which is opposite from that of the second initial drive operation. When it is determined that the count value of the excitation execution number counter CASE is not 10 at step 118a (i.e., in the case where the count value of the excitation execution number counter CASE is 6), the present routine is terminated without executing any further steps. In this case, the second initial drive operation is executed in the opposite drive direction, which is opposite from that of the first initial drive operation.

In the second embodiment, in the case where the second initial drive operation is executed after it is determined that the result of the learning in the first initial drive operation is incorrect (erroneous learning), the drive direction of the rotor 32 is changed to the opposite drive direction, which is opposite from that of the first initial drive operation. Therefore, for example, when the erroneous learning occurs due to the application of the load to the rotor 32 upon abutment to the one of the delimiting positions (side walls), which define the range of the looseness (play), in the middle of the first initial drive operation, the load applied to the rotor 32 is released in the second initial drive operation, and the rotor 32 is rotated within the range of the looseness (play) to correctly learn the relationship among the encoder count value, the rotational position of the rotor 32 and the exciting phase(s).

In the present invention, it is possible to use an encoder, which does not output the Z-phase signal (i.e., the encoder that outputs only the A-phase signal and the B-phase signal). Furthermore, the encoder 46 is not limited to the magnetic encoder. For example, an optical encoder or a brush encoder may be used in place of the magnetic encoder.

Furthermore, in the first and second embodiments, the SR motor 12 is used. However, the motor 12 is not limited to the SR motor. That is, in place of the SR motor, it is possible to use any other type of brushless synchronous motor, in which an exciting phase(s) is sequentially changed by sensing a rotational position of a rotor based on a count value of an output signal(s) of the encoder.

Furthermore, in the range change apparatus of the first and second embodiments, the range is changed between the P-range and the Non-P-range. Alternatively, the present invention may be applied to a range change apparatus, in which a range change valve and a manual valve of the automatic transmission are changed synchronously with the rotational operation of the detent lever 15 to change the range to any one of the multiple ranges, such as the parking range (P-range), the reverse range (R-range), the neutral range (N-range) and the drive range (D-range) and the like.

Furthermore, the present invention is not limited to the range change apparatus and can be applied to any other types of position change apparatuses, which use the brushless synchronous motor (e.g., the SR motor) as its drive source.

In each of the first and second embodiments, the range change control apparatus 42 may constitute the motor control apparatus of the present invention. Furthermore, the encoder 46 and/or the output shaft sensor 14 may also constitute part of the motor control apparatus.

Additional advantages and modifications will readily occur to those skilled in the art. The invention in its broader terms is therefore not limited to the specific details, representative apparatus, and illustrative examples shown and described.

What is claimed is:

1. A motor control apparatus that controls rotation of a rotor of an electric motor, which has a plurality of windings to form a plurality of phases and is powered from an electric power source, the motor control apparatus comprising:

an encoder that outputs an A-phase signal and a B-phase signal at predetermined angular intervals in response to the rotation of the rotor such that a predetermined phase difference is created between the A-phase signal and the B-phase signal;

a learning means for executing an initial position learning process, wherein:

at time of executing the initial position learning process, the learning means sequentially changes each current exciting phase among the plurality of phases through one complete cycle at a predetermined time schedule during an initial drive operation after turning on of the electric power source, so that a rotational position of the rotor and its corresponding exciting phase coincide with each other at some timing during the initial drive operation, and thereby the rotor is rotated, and the learning means counts the A-phase signal and the B-phase signal during the rotation of the rotor in the initial drive operation and learns a relationship among a count value of the A-phase signal and the B-phase signal counted by the learning means, a rotational position of the rotor and each exciting one of the plurality of phases at an end of the initial drive operation;

the learning means determines whether a result of the learning of the learning means is erroneous based on a pattern of the A-phase signal and the B-phase signal at the end of the initial drive operation; and when the learning means determines that the result of the learning of the learning means is erroneous, the learning means re-executes the initial position learning process by re-executing the initial drive operation; and a control means for driving the rotor, wherein the control means determines a current rotational position of the rotor based on a current count value of the A-phase single and the B-phase signal with reference to the result of the learning of the learning means and sequentially changes each current exciting phase among the plurality of phases based on the current rotational position of the rotor in a normal drive operation after the end of the initial drive operation.

2. The motor control apparatus according to claim 1, wherein:

the learning means drives the rotor in a 1-2 phase excitation mode by alternately executing a 2 phase excitation and a 1 phase excitation during the initial drive operation and terminates the initial drive operation at a corresponding rotational position of the rotor where the 2 phase excitation is executed; and when the pattern of the A-phase signal and the B-phase signal at the end of the initial drive operation is not a pattern that corresponds to the 2 phase excitation, the learning means determines that the result of the learning of the learning means is erroneous and re-executes the initial position learning process by re-executing the initial drive operation.

3. The motor control apparatus according to claim 1, wherein when the learning means re-executes the initial drive operation after it is determined that the result of the learning is erroneous, the learning means re-executes the initial drive operation by changing a drive direction of the rotor to an opposite drive direction that is opposite from that of the rotor in the previous initial drive operation.

4. The motor control apparatus according to claim 1, wherein the motor is a motor that drives a range change mechanism of an automatic transmission.

* * * * *